US010256894B2

(12) United States Patent
Eitan et al.

(10) Patent No.: US 10,256,894 B2
(45) Date of Patent: Apr. 9, 2019

(54) HYBRID BEAM FORMER

(71) Applicant: QUALCOMM Incorporated, San Diego, CA (US)

(72) Inventors: Alecsander Eitan, Haifa (IL); Amichai Sanderovich, Atlit (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/700,461

(22) Filed: Sep. 11, 2017

(65) Prior Publication Data
US 2019/0081693 A1     Mar. 14, 2019

(51) Int. Cl.
  *H04B 7/08*     (2006.01)
  *H01Q 3/36*     (2006.01)
(52) U.S. Cl.
  CPC ............. *H04B 7/0874* (2013.01); *H01Q 3/36* (2013.01)
(58) Field of Classification Search
  CPC ................................ H04B 7/0874; H01Q 3/36
  See application file for complete search history.

(56) References Cited

U.S. PATENT DOCUMENTS

| | | | | |
|---|---|---|---|---|
| 6,549,164 B2* | 4/2003 | Paschen | ................ | H01Q 3/267 342/371 |
| 6,906,665 B1* | 6/2005 | Lam | ....................... | H01Q 3/26 342/368 |
| 8,666,347 B2* | 3/2014 | Wilkerson | ............. | H04B 1/109 455/278.1 |
| 8,730,112 B2* | 5/2014 | Sakata | ................... | G01R 29/10 343/703 |
| 9,614,594 B2 | 4/2017 | Kim et al. | | |
| 2014/0357319 A1 | 12/2014 | Maltsev et al. | | |

(Continued)

FOREIGN PATENT DOCUMENTS

| | | |
|---|---|---|
| EP | 3091681 A1 | 11/2016 |
| WO | WO-2016078565 A1 | 5/2016 |

OTHER PUBLICATIONS

Sohrabi F., et al., "Hybrid Digital and Analog Beamforming Design for Large-Scale Antenna Arrays", IEEE Journal of Selected Topics in Signal Processing, Jan. 25, 2017, pp. 1-13.

(Continued)

*Primary Examiner* — Kabir A Timory
(74) *Attorney, Agent, or Firm* — Steven R. Thiel; Loza & Loza

(57) ABSTRACT

In certain aspects of the present disclosure, an apparatus for wireless communications is provided. The apparatus comprises a plurality of block circuits, wherein each one of the plurality of block circuits is configured to receive a respective plurality of signals from a respective subset of antenna elements of an antenna array. Each one of the plurality of block circuits comprises a respective plurality of phase shifters configured to shift phases of the respective plurality of signals to obtain a respective plurality of phase-shifted signals, and a respective combiner configured to combine the respective plurality of phase-shifted signals into a respective combined signal. The apparatus also comprises a plurality of time-delay elements configured to delay the combined signals to obtain a plurality of delayed combined signals, and a combiner configured to combine the plurality of delayed combined signals into a total combined signal.

12 Claims, 12 Drawing Sheets

(56) References Cited

U.S. PATENT DOCUMENTS

2015/0163004 A1* 6/2015 Harel ................. H04J 3/1694
370/278
2016/0269093 A1 9/2016 Seol et al.
2017/0111149 A1 4/2017 Kim et al.

OTHER PUBLICATIONS

International Search Report and Written Opinion—PCT/US2018/043457—ISA/EPO—Oct. 5, 2018.

* cited by examiner

HYBRID BEAM FORMER

FIELD

Certain aspects of the present disclosure generally relate to wireless communications and, more particularly, to beam forming in a wireless communication system.

BACKGROUND

In order to address the issue of increasing bandwidth requirements demanded for wireless communication systems, different schemes are being developed. In some schemes, data is wirelessly transmitted at high data rates over one or more channels in the 60 GHz range.

SUMMARY

One aspect relates to an apparatus for wireless communications. The apparatus comprises a plurality of block circuits, wherein each one of the plurality of block circuits is configured to receive a respective plurality of signals from a respective subset of antenna elements of an antenna array. Each one of the plurality of block circuits comprises a respective plurality of phase shifters configured to shift phases of the respective plurality of signals to obtain a respective plurality of phase-shifted signals, and a respective combiner configured to combine the respective plurality of phase-shifted signals into a respective combined signal. The apparatus also comprises a plurality of time-delay elements configured to delay the combined signals to obtain a plurality of delayed combined signals, and a combiner configured to combine the plurality of delayed combined signals into a total combined signal.

A second aspect relates to a method for wireless communications. The method comprises, for each one of a plurality of subsets of antenna elements of an antenna array, receiving a respective plurality of signals from the respective one of the plurality of subsets of the antenna elements of the antenna array, shifting phases of the respective plurality of signals to obtain a respective plurality of phase-shifted signals, and combining the respective plurality of phase-shifted signals into a respective combined signal. The method also comprises delaying the combined signals to obtain a plurality of delayed combined signals, and combining the plurality of delayed combined signals into a total combined signal.

A third aspect relates to an apparatus for wireless communications. The apparatus comprises, for each one of a plurality of subsets of antenna elements of an antenna array, means for receiving a respective plurality of signals from the respective one of the plurality of subsets of the antenna elements of the antenna array, means for shifting phases of the respective plurality of signals to obtain a respective plurality of phase-shifted signals, and means for combining the respective plurality of phase-shifted signals into a respective combined signal. The apparatus also comprises means for delaying the combined signals to obtain a plurality of delayed combined signals, and means for combining the plurality of delayed combined signals into a total combined signal.

A fourth aspect relates to a wireless node. The wireless node comprises an antenna array comprising antenna elements. The wireless node also comprises a plurality of block circuits, wherein each one of the plurality of block circuits is configured to receive a respective plurality of signals from another wireless node via a respective subset of the antenna elements of the antenna array. Each one of the plurality of block circuits comprises a respective plurality of phase shifters configured to shift phases of the respective plurality of signals to obtain a respective plurality of phase-shifted signals, and a respective combiner configured to combine the respective plurality of phase-shifted signals into a respective combined signal. The wireless node also comprises a plurality of time-delay elements configured to delay the combined signals to obtain a plurality of delayed combined signals, and a combiner configured to combine the plurality of delayed combined signals into a total combined signal.

A fifth aspect relates to an apparatus for wireless communications. The apparatus comprises a splitter configured to split an input signal into a first plurality of signals, a plurality of delay elements configured to delay the first plurality of signals to obtain a plurality of delayed signals, and a plurality of block circuits. Each one of the plurality of block circuits comprises a respective splitter configured to receive a respective one of the plurality of delayed signals, and to split the respective one of the plurality of delayed signals into a respective second plurality of signals, and a respective plurality of phase shifters configured to shift phases of the respective second plurality of signals to obtain a respective plurality of phase-shifted signals. Each one of the plurality of block circuits is configured to output the respective plurality of phase-shifted signals to a respective subset of antenna elements of an antenna array.

A sixth aspect relates to a method for wireless communications. The method comprises splitting an input signal into a first plurality of signals, and delaying the first plurality signals to obtain a plurality of delayed signals. The method also comprises, for each one of a plurality of subsets of antenna elements of an antenna array, splitting a respective one of the plurality of delayed signals into a respective second plurality of signals, shifting phases of the respective second plurality of signals to obtain a respective plurality of phase-shifted signals, and outputting the respective plurality of phase-shifted signals to the respective one of the plurality of subsets of the antenna elements of the antenna array.

A seventh aspect relates to an apparatus for wireless communications. The apparatus comprises means for splitting an input signal into a first plurality of signals, and means for delaying the first plurality of signals to obtain a plurality of delayed signals. The apparatus also comprises, for each one of a plurality of subsets of antenna elements of an antenna array, means for splitting a respective one of the plurality of delayed signals into a respective second plurality signals, means for shifting phases of the respective second plurality of signals to obtain a respective plurality of phase-shifted signals, and means for outputting the respective plurality of phase-shifted signals to the respective one of the plurality of subsets of the antenna elements of the antenna array.

An eighth aspect relates to a wireless node. The wireless node comprises an antenna array comprising antenna elements. The wireless node also comprises a splitter configured to split an input signal into a first plurality of signals, a plurality of delay elements configured to delay the first plurality of signals to obtain a plurality of delayed signals, and a plurality of block circuits. Each one of the plurality of block circuits comprises a respective splitter configured to receive a respective one of the plurality of delayed signals, and to split the respective one of the plurality of delayed signals into a respective second plurality of signals, and a respective plurality of phase shifters configured to shift phases of the respective second plurality of signals to obtain a respective plurality of phase-shifted signals. Each one of the plurality of block circuits is configured to output the respective plurality of phase-shifted signals to a respective subset of the antenna elements of the antenna array.

DETAILED DESCRIPTION

Figure 1:
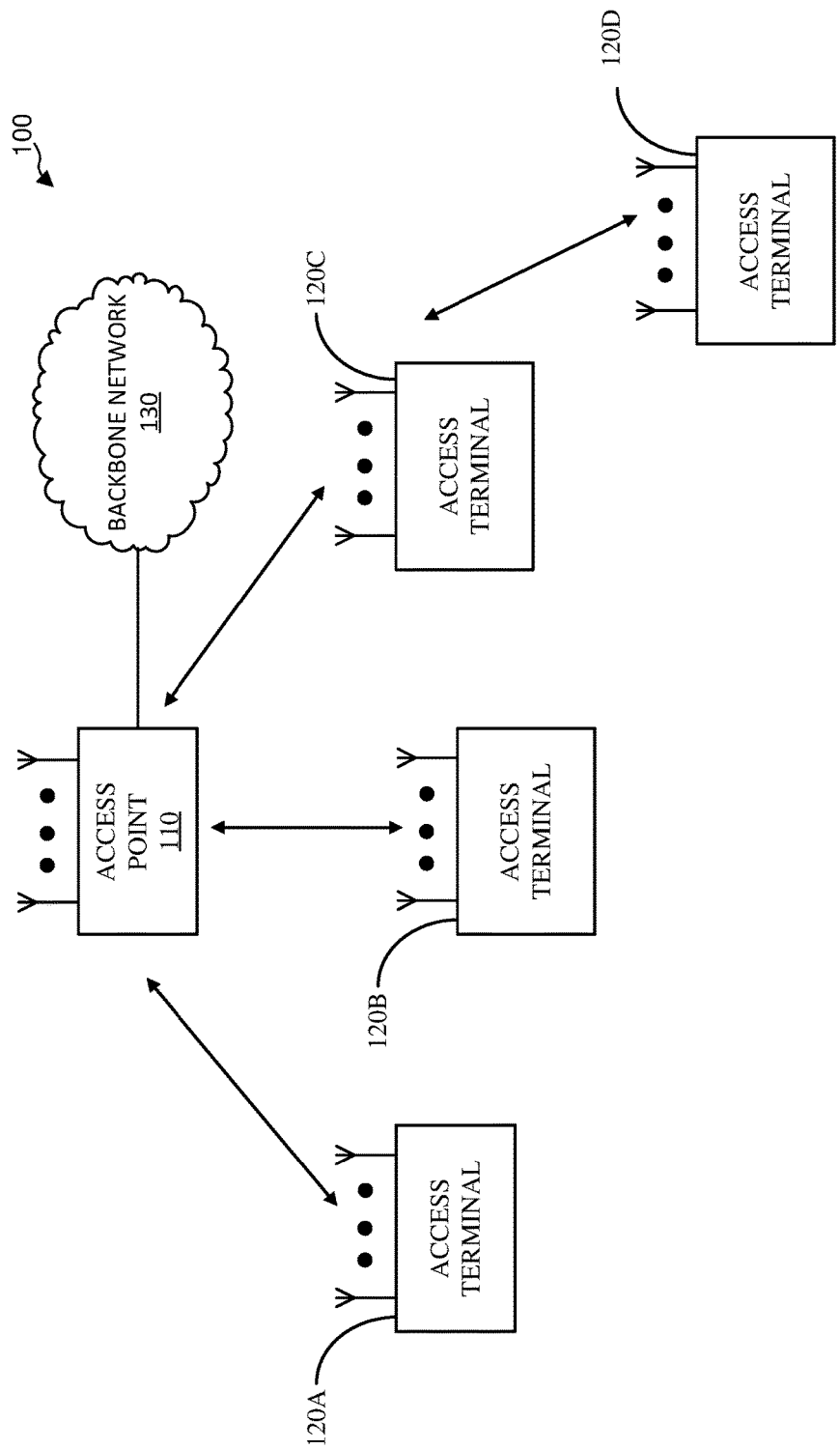
FIG. 1 illustrates an exemplary wireless communication system according to certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple access terminals. A TDMA system may allow multiple access terminals to share the same frequency channel by dividing the transmission signal into different time slots, each time slot being assigned to different access terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

With reference to the following description, it shall be understood that not only communications between access points and user devices are allowed, but also direct (e.g., peer-to-peer) communications between respective user devices are allowed. Furthermore, a device (e.g., an access point or user device) may change its behavior between a user device and an access point according to various conditions. Also, one physical device may play multiple roles: user device and access point, multiple user devices, multiple access points, for example, on different channels, different time slots, or both.

FIG. 1 illustrates an example of a wireless communication system 100 with access points and access terminals. For simplicity, only one access point 110 is shown in FIG. 1. An access point is generally a fixed station that communicates with the access terminals and may also be referred to as a base station or some other terminology. An access terminal may be fixed or mobile and may also be referred to as a mobile station, a wireless device or some other terminology. Access point 110 may communicate with one or more access terminals 120 at any given moment on the downlink and uplink. The downlink (i.e., forward link) is the communication link from the access point to the access terminals, and the uplink (i.e., reverse link) is the communication link from the access terminals to the access point. An access terminal may also communicate peer-to-peer with another access terminal. The access point 110 may be coupled to a backbone network 130 (e.g., the Internet) to provide the access terminals with access to the backbone network 130.

Figure 2:
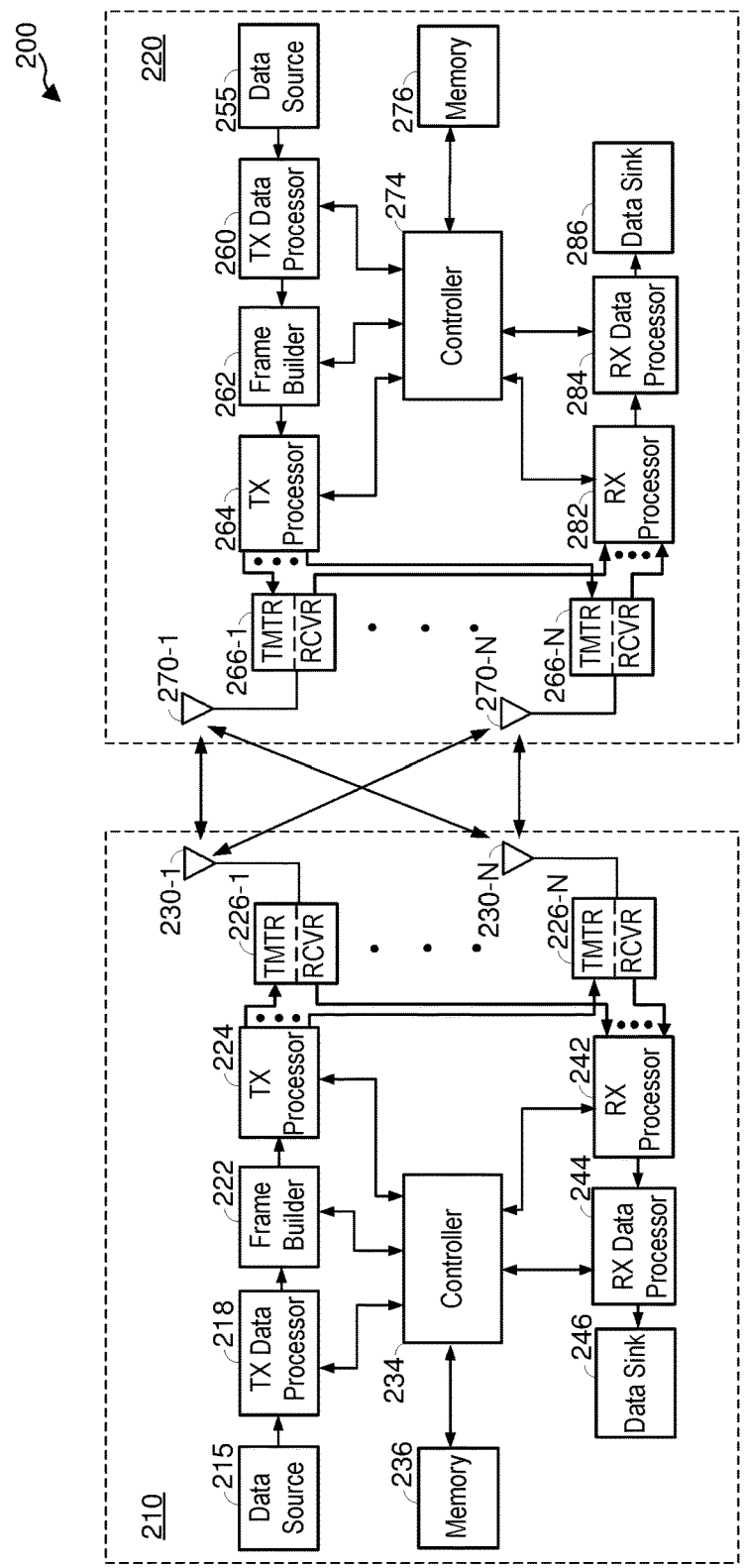
FIG. 2 is a block diagram of an exemplary access point and access terminal according to certain aspects of the present disclosure.

FIG. 2 illustrates a block diagram of an access point 210 (generally, a first wireless node) and an access terminal 220 (generally, a second wireless node) of the wireless communication system 200. The access point 210 is a transmitting entity for the downlink and a receiving entity for the uplink. The access terminal 220 is a transmitting entity for the uplink and a receiving entity for the downlink. As used herein, a "transmitting entity" is an independently operated apparatus or wireless node capable of transmitting data via a wireless channel, and a "receiving entity" is an independently operated apparatus or wireless node capable of receiving data via a wireless channel.

Although, in this example, wireless node 210 is an access point and wireless node 220 is an access terminal, it shall be understood that the wireless node 210 may alternatively be an access terminal, and wireless node 220 may alternatively be an access point. The wireless node 210 may be used to implement the access point 110 in FIG. 1, and the wireless node 220 may be used to implement any one of the access terminals 120 in FIG. 1.

For transmitting data, the access point 210 comprises a transmit data processor 218, a frame builder 222, a transmit processor 224, a plurality of transceivers 226-1 to 226-N, and a plurality of antennas 230-1 to 230-N. The access point 210 also comprises a controller 234 configured to control operations of the access point 210, as discussed further below.

In operation, the transmit data processor 218 receives data (e.g., data bits) from a data source 215, and processes the data for transmission. For example, the transmit data processor 218 may encode the data (e.g., data bits) into encoded data, and modulate the encoded data into data symbols. The transmit data processor 218 may support different modulation and coding schemes (MCSs). For example, the transmit data processor 218 may encode the data (e.g., using low-density parity check (LDPC) encoding) at any one of a plurality of different coding rates. Also, the transmit data processor 218 may modulate the encoded data using any one of a plurality of different modulation schemes, including, but not limited to, BPSK, QPSK, 16QAM, 64QAM, 64APSK, 128APSK, 256QAM, and 256APSK.

In certain aspects, the controller 234 may send a command to the transmit data processor 218 specifying which modulation and coding scheme (MCS) to use (e.g., based on channel conditions of the downlink), and the transmit data processor 218 may encode and modulate data from the data source 215 according to the specified MCS. It is to be appreciated that the transmit data processor 218 may perform additional processing on the data such as data scrambling, and/or other processing. The transmit data processor 218 outputs the data symbols to the frame builder 222.

The frame builder 222 constructs a frame (also referred to as a packet), and inserts the data symbols into a data payload of the frame. The frame builder 222 outputs the frame to the transmit processor 224. The transmit processor 224 processes the frame for transmission on the downlink. For example, the transmit processor 224 may support different transmission modes such as an orthogonal frequency-division multiplexing (OFDM) transmission mode and a single-carrier (SC) transmission mode. In this example, the controller 234 may send a command to the transmit processor 224 specifying which transmission mode to use, and the transmit processor 224 may process the frame for transmission according to the specified transmission mode.

In certain aspects, the transmit processor 224 may support multiple-output-multiple-input (MIMO) transmission. In these aspects, the access point 210 includes multiple antennas 230-1 to 230-N and multiple transceivers 226-1 to 226-N (e.g., one for each antenna). The transmit processor 224 may perform spatial processing on the incoming frames and provide a plurality of transmit frame streams for the plurality of antennas. The transceivers 226-1 to 226-N receive and process (e.g., convert to analog, amplify, filter, and frequency upconvert) the respective transmit frame streams to generate transmit signals for transmission via the antennas 230-1 to 230-N.

For transmitting data, the access terminal 220 comprises a transmit data processor 260, a frame builder 262, a transmit processor 264, a plurality of transceivers 266-1 to 266-N, and a plurality of antennas 270-1 to 270-N. The access terminal 220 may transmit data to the access point 210 on the uplink, and/or transmit data to another access terminal (e.g., for peer-to-peer communication). The access terminal 220 also comprises a controller 274 configured to control operations of the access terminal 220, as discussed further below.

In operation, the transmit data processor 260 receives data (e.g., data bits) from a data source 255, and processes (e.g., encodes and modulates) the data for transmission. The transmit data processor 260 may support different MCSs. For example, the transmit data processor 260 may encode the data (e.g., using LDPC encoding) at any one of a plurality of different coding rates, and modulate the encoded data using any one of a plurality of different modulation schemes, including, but not limited to, BPSK, QPSK, 16QAM, 64QAM, 64APSK, 128APSK, 256QAM, and 256APSK. In certain aspects, the controller 274 may send a command to the transmit data processor 260 specifying which MCS to use (e.g., based on channel conditions of the uplink), and the transmit data processor 260 may encode and modulate data from the data source 255 according to the specified MCS. It is to be appreciated that the transmit data processor 260 may perform additional processing on the data. The transmit data processor 260 outputs the data symbols to the frame builder 262.

The frame builder 262 constructs a frame, and inserts the received data symbols into a data payload of the frame. The frame builder 262 outputs the frame to the transmit processor 264. The transmit processor 264 processes the frame for transmission. For example, the transmit processor 264 may support different transmission modes such as an OFDM transmission mode and an SC transmission mode. In this example, the controller 274 may send a command to the transmit processor 264 specifying which transmission mode to use, and the transmit processor 264 may process the frame for transmission according to the specified transmission mode.

In certain aspects, the transmit processor 264 may support multiple-output-multiple-input (MIMO) transmission. In these aspects, the access terminal 220 includes multiple antennas 270-1 to 270-N and multiple transceivers 266-1 to 266-N (e.g., one for each antenna). The transmit processor 264 may perform spatial processing on the incoming frame and provide a plurality of transmit frame streams for the plurality of antennas. The transceivers 266-1 to 266-N receive and process (e.g., convert to analog, amplify, filter, and frequency upconvert) the respective transmit frame streams to generate transmit signals for transmission via the antennas 270-1 to 270-N.

For receiving data, the access point 210 comprises a receive processor 242, and a receive data processor 244. In operation, the transceivers 226-1 to 226-N receive signals (e.g., from the access terminal 220) via the antennas 230-1 to 230-N, and process (e.g., frequency downconvert, amplify, filter and convert to digital) the received signals.

The receive processor 242 receives the outputs of the transceivers 226-1 to 226-N, and processes the outputs to recover data symbols. For example, the access point 210 may receive data (e.g., from the access terminal 220) in a frame. In this example, the receive processor 242 may detect the start of the frame using the STF sequence in the preamble of the frame. The receive processor 242 may also use the STF for automatic gain control (AGC) adjustment. The receive processor 242 may also perform channel estimation (e.g., using the CE sequence in the preamble of the frame) and perform channel equalization on the received signal based on the channel estimation.

The receive processor 242 may also recover information (e.g., MCS scheme) from the header of the frame, and send the information to the controller 234. After performing channel equalization, the receive processor 242 may recover data symbols from the frame, and output the recovered data symbols to the receive data processor 244 for further processing. It is to be appreciated that the receive processor 242 may perform other processing.

The receive data processor 244 receives the data symbols from the receive processor 242 and an indication of the corresponding MSC scheme from the controller 234. The receive data processor 244 demodulates and decodes the data symbols to recover the data according to the indicated MSC scheme, and outputs the recovered data (e.g., data bits) to a data sink 246 for storage and/or further processing.

As discussed above, the access terminal 220 may transmit data using an OFDM transmission mode or a SC transmission mode. In this case, the receive processor 242 may process the receive signal according to the selected transmission mode. Also, as discussed above, the transmit processor 264 may support multiple-output-multiple-input (MIMO) transmission. In this case, the access point 210 includes multiple antennas 230-1 to 230-N and multiple transceivers 226-1 to 226-N (e.g., one for each antenna). Each transceiver receives and processes (e.g., frequency downconverts, amplifies, filters, and converts to digital) the signal from the respective antenna. The receive processor 242 may perform spatial processing on the outputs of the transceivers 226-1 to 226-N to recover the data symbols.

For receiving data, the access terminal 220 comprises a receive processor 282, and a receive data processor 284. In operation, the transceivers 266-1 to 266-N receive signals (e.g., from the access point 210 or another access terminal) via the antennas 270-1 to 270-N, and process (e.g., frequency downconvert, amplify, filter and convert to digital) the received signals.

The receive processor 282 receives the outputs of the transceivers 266-1 to 266-N, and processes the outputs to recover data symbols. For example, the access terminal 220 may receive data (e.g., from the access point 210 or another access terminal) in a frame, as discussed above. In this example, the receive processor 282 may detect the start of the frame using the STF sequence in the preamble of the frame. The receive processor 282 may also perform channel estimation (e.g., using the CE sequence in the preamble of the frame) and perform channel equalization on the received signal based on the channel estimation.

The receive processor 282 may also recover information (e.g., MCS scheme) from the header of the frame, and send the information to the controller 274. After performing channel equalization, the receive processor 282 may recover data symbols from the frame, and output the recovered data symbols to the receive data processor 284 for further processing. It is to be appreciated that the receive processor 282 may perform other processing.

The receive data processor 284 receives the data symbols from the receive processor 282 and an indication of the corresponding MSC scheme from the controller 274. The receive data processor 284 demodulates and decodes the data symbols to recover the data according to the indicated MSC scheme, and outputs the recovered data (e.g., data bits) to a data sink 286 for storage and/or further processing.

As discussed above, the access point 210 or another access terminal may transmit data using an OFDM transmission mode or a SC transmission mode. In this case, the receive processor 282 may process the receive signal according to the selected transmission mode. Also, as discussed above, the transmit processor 224 may support multiple-output-multiple-input (MIMO) transmission. In this case, the access terminal 220 includes multiple antennas 270-1 to 270-N and multiple transceivers 266-1 to 266-N (e.g., one for each antenna). Each transceiver receives and processes (e.g., frequency downconverts, amplifies, filters, and converts to digital) the signal from the respective antenna. The receive processor 282 may perform spatial processing on the outputs of the transceivers to recover the data symbols.

As shown in FIG. 2, the access point 210 also comprises a memory 236 coupled to the controller 234. The memory 236 may store instructions that, when executed by the controller 234, cause the controller 234 to perform one or more of the operations described herein. Similarly, the access terminal 220 also comprises a memory 276 coupled to the controller 274. The memory 276 may store instructions that, when executed by the controller 274, cause the controller 274 to perform the one or more of the operations described herein.

Beam Forming

High frequency communication systems (e.g., 60 GHz range) suffer from high signal attenuation (e.g., due to high atmospheric absorption). To compensate for high signal attenuation, high frequency communication systems typically use large antenna arrays for transmission/reception. A large antenna array includes multiple antenna elements that provide a communication system with array gain. The antenna elements in an antenna array may be spaced apart by half a wavelength, which translates into a spacing of approximately 2.5 mm for a carrier frequency of 60 GHz. The relatively small spacing between antenna elements at high frequencies allows for the use of large antenna arrays for high frequency communication systems for increased array gain.

A large antenna array may also employ beamforming to compensate for high signal attenuation, in which the transmit and/or receive beam of the antenna array is electronically steered to a desired direction (e.g., towards a target device). For example, if the large antenna is part of the access point 210, then the beam may be directed towards the access terminal 220. The beam of the antenna array may be steered using time-delay elements or phase shifters.

Figure 3:
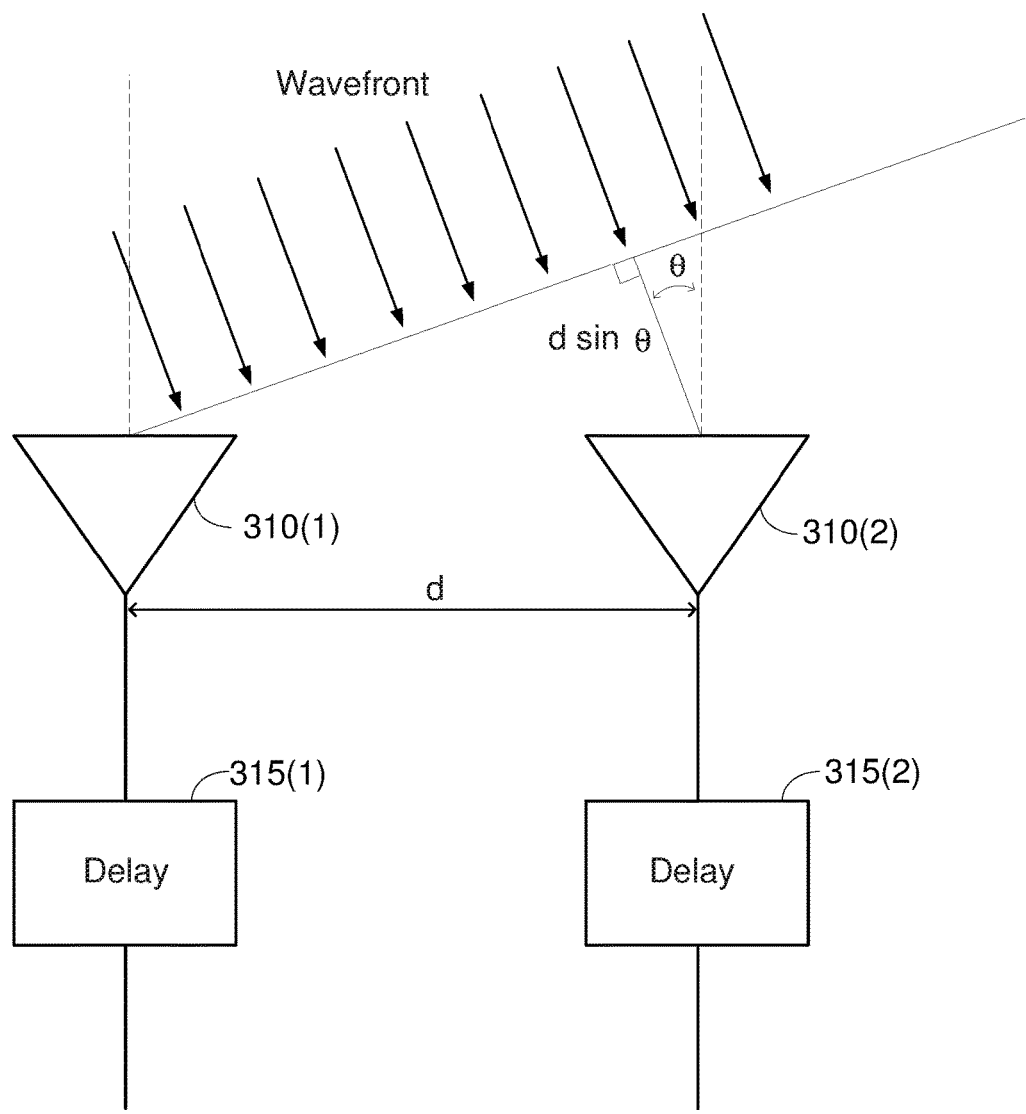
FIG. 3 illustrates an example of an antenna array using time delay beam steering according to aspects of the present disclosure.

In this regard, FIG. 3 shows an example of two antenna elements 310(1) and 310(2) of a time delay beam steering antenna array. The antenna elements 310(1) and 310(2) are coupled to adjustable delay elements 315(1) and 315(2), respectively, which are used to adjust the time delay between the antenna elements 310(1) and 310(2), as discussed further below. In this example, the distance (i.e., spacing) between the antenna elements 310(1) and 310(2) is d, and the wavefront of a radio signal to be received by the antenna array arrives at an angle θ with respect to the antenna boresite. In this example, the wavefront of the radio signal needs to travel an additional distance of d·sin θ to reach antenna element 310(2) relative to antenna element 310(1). This additional distance translates to a time delay of:

$$\Delta t = \frac{d \sin\theta}{c} \quad \text{(Eq. 1)}$$

where Δt is the time delay and c is the propagation speed of the radio signal. Thus, in this example, delay element 315(1) is adjusted to delay the signal received by antenna element 310(1) by a time delay of Δt relative to the signal received by antenna element 310(2). As shown in Equation 1, the time delay Δt is a function of the distance (spacing) between the antenna elements 310(1) and 310(2) and the angle between the direction of the radio signal and the antenna boresite. The time delay Δt does not depend on the frequency of the radio signal.

Delay elements tend to be costly. As a result, it is typically cost prohibitive to provide a separate time delay element for each antenna element in a large antenna array. For this reason, existing designs for IEEE 802.11ad, IEEE 802.11ay and developing 5G NR use phase shifters to steer the beam of a large antenna array instead of time-delay elements. The time delay Δt discussed above can be expressed as a phase shift for a given frequency f as follows:

$$\Delta\phi = 2\pi f \Delta t \quad \text{(Eq. 2)}$$

where Δϕ is the phase shift between adjacent antenna elements 310(1) and 310(2). Note that a phase shifter provides simulated time delay that is frequency dependent.

Figure 4:
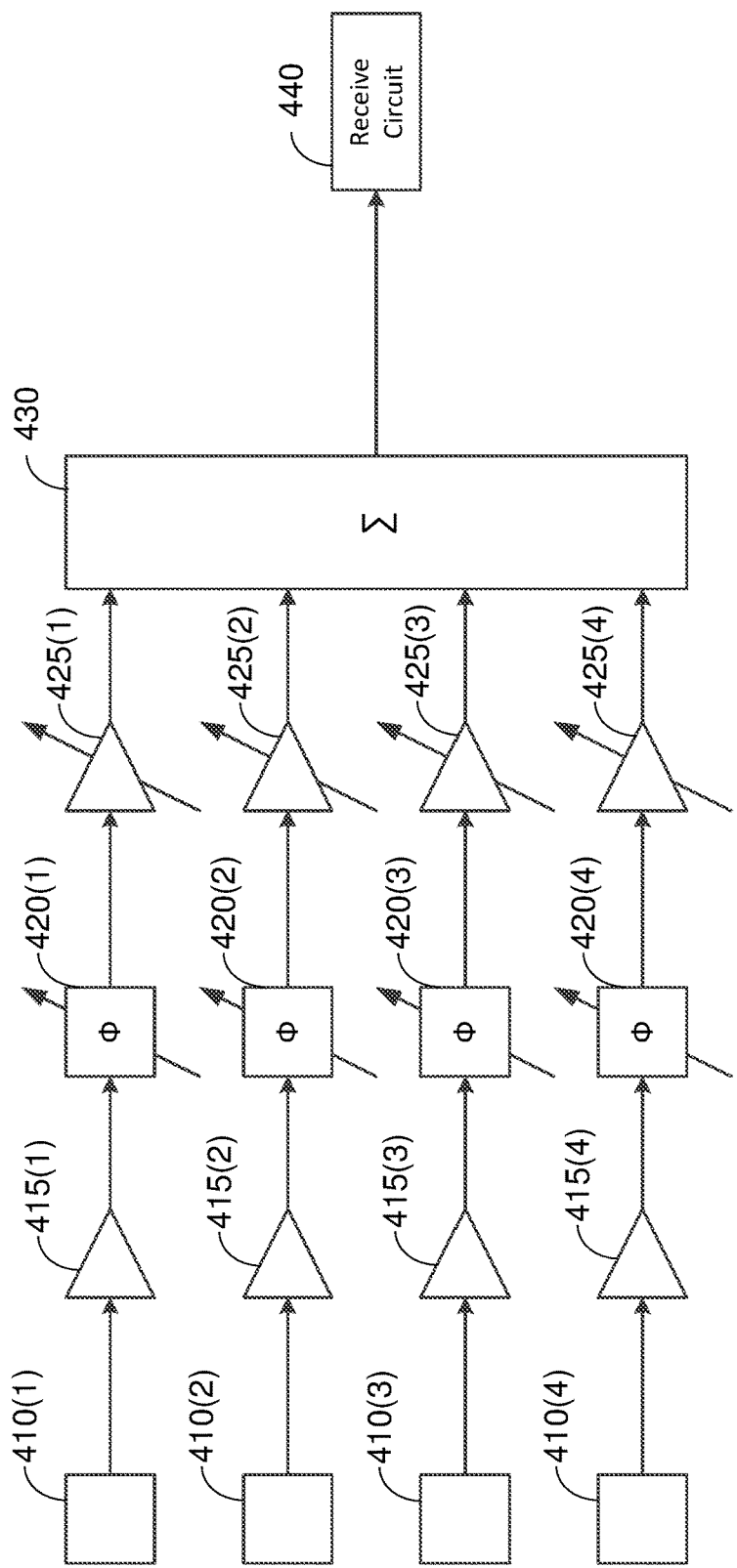
FIG. 4 illustrates an example of a beamforming system using phase shifters according to aspects of the present disclosure.

FIG. 4 shows an example of four antenna elements 410(1) to 410(4) of an antenna array, in which phase shifters 420(1) to 420(4) are used to steer the receive beam of the antenna array in a desired direction. In this example, the signal from each antenna element is amplified by a respective low noise amplifier (LNA) 415(1) to 415(4), phase shifted by a respective phase shifter 420(1) to 420(4) based on the desired receive beam direction, and amplified by a respective variable gain amplifier 425(1) to 425(4). The phase-shifted signals are combined by a combiner 430, and the resulting combined signal is output to a receive circuit 440 (e.g., an RF chain) for further processing (e.g., frequency down conversion, filtering, analog-to-digital conversion, demodulation, etc.).

The main issue with using phase shifters instead of delay elements is that the use of phase shifters has negative effects on the signal, array gain and beam-width. The negative effects scale with the angle between the boresight and direction of the beam, signal bandwidth, and the overall size of the antenna array. It is expected that 802.11 ad and 802.11ay access points (APs) and some stations (STAs) as well as 5G NR base stations with large antenna arrays will suffer from these effects.

For example, each antenna element of an antenna array may receive a symbol on a radio signal, which is phase shifted by the respective phase shifter. Ideally, the resulting phase-shifted symbols should be aligned for proper combining by the combiner. However, in practice, the phase-shifted symbols are misaligned, which leads to incorrect combining of the phase-shifted symbols if the misalignment is too large. The misalignment scales with the symbol bandwidth and the size of the antenna array. For example, for a symbol bandwidth of 2 GHz, an array width of 2 to 3 cm may be acceptable, while an array width of 10 cm may lead to incorrect symbol combining (and therefore have less array gain than expected). In this example, symbols may be modulated on a radio signal having a carrier frequency (e.g., 60 GHz).

Embodiments of the present disclosure provide hybrid beamforming that combines phase shifters with time-delay elements to mitigate the aforementioned negative effects.

An exemplary hybrid system will now be described according to some embodiments of the present disclosure. The hybrid system includes a large antenna array partitioned (i.e., divided) into multiple antenna blocks, where each antenna block includes a subset of the antenna elements of the array. In this regard, FIG. 5 shows an example of a large antenna array 505 partitioned into multiple antenna blocks 510(1) to 510(n), where each of the antenna blocks 510(1) to 510(n) includes a subset of the antenna elements of the antenna array 505.

Figure 5:
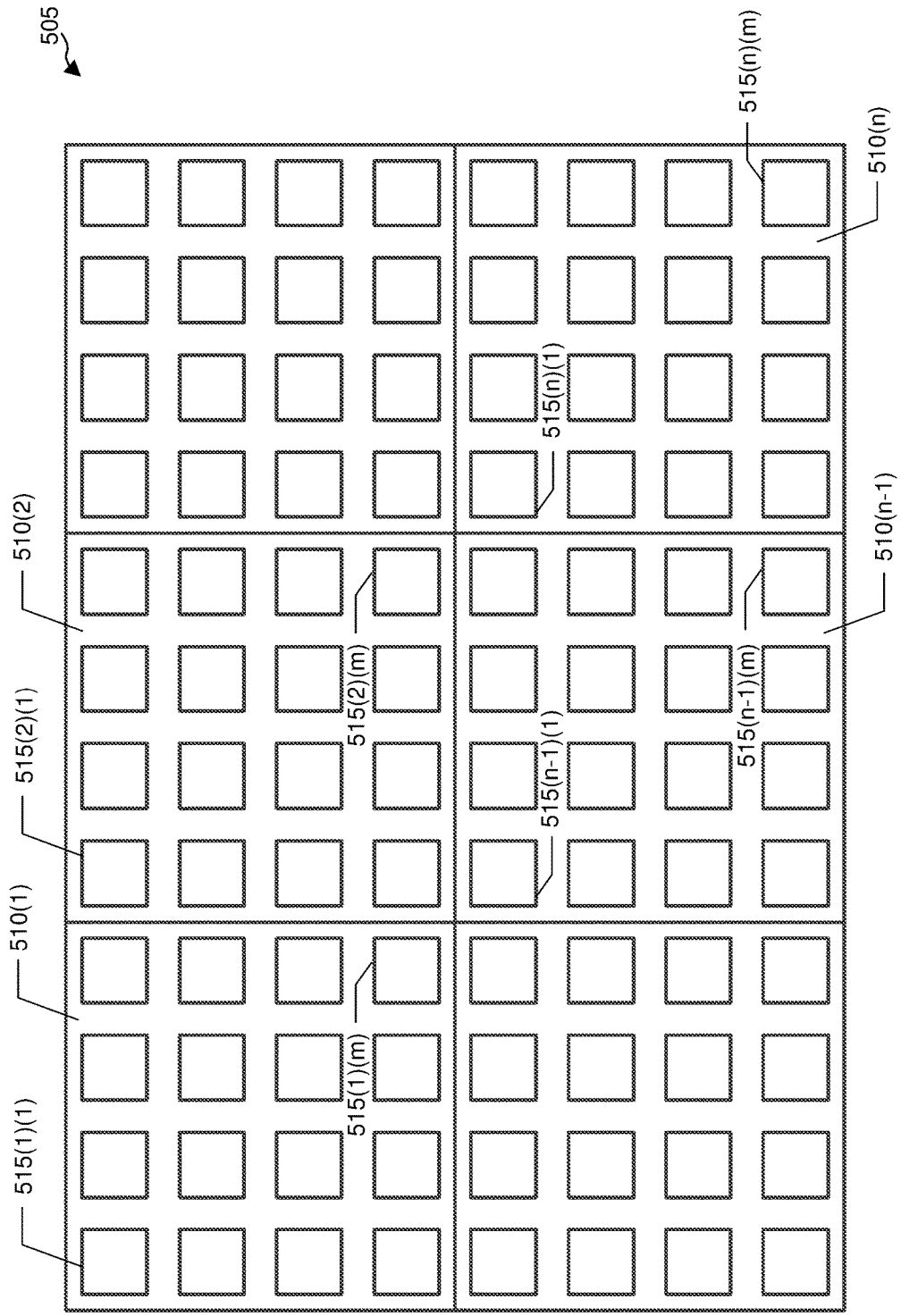
FIG. 5 illustrates an example of an antenna array partitioned into multiple antenna blocks where each antenna block includes a subset of the antenna elements of the antenna array according to aspects of the present disclosure.

In FIG. 5, an antenna element is referenced with the reference number 515 followed by a number in first parenthesis and a number in second parenthesis. The number in the first parenthesis indicates the antenna block in which the respective antenna element is located, and the number in the second parenthesis distinguishes the respective antenna element from other antenna elements in the same block. In FIG. 5, only some of the antenna elements 515(1)(1) to 515(n)(m) are referenced by reference numbers to avoid cluttering FIG. 5. In FIG. 5, the number n indicates the number of antenna blocks 510(1) to 510(n) in the antenna array 505, and the number m indicates the number of antenna elements 515(1)(1) to 515(n)(m) in each antenna block 510(1) to 510(n). The antenna elements 515(1)(1) to 515(n)(m) within each antenna block 510(1) to 510(n) may be spaced close together (e.g., half a wavelength of the radio signal to be received or transmitted).

In the example shown in FIG. 5, each antenna block 510(1) to 510(n) includes 16 antenna elements 515(1)(1) to 515(n)(m) of the array 505 (i.e., m=16). However, it is to be appreciated that the present disclosure is not limited to this example, and that each antenna block 510(1) to 510(n) may include a different number of antenna elements 515(1)(1) to 515(n)(m). Also, in this example, there are six antenna blocks (i.e., n=6). However, it is to be appreciated that the present disclosure is not limited to this example, and that the antenna array 505 may include a different number of antenna blocks 510(1) to 510(n). Further, although each antenna block 510(1) to 510(n) is shown having the same number of antenna elements 515(1)(1) to 515(n)(m), it is to be appreciated that the present disclosure is not limited to this example, and that different antenna blocks 510(1) to 510(n) may have different numbers of antenna elements 515(1)(1) to 515(n)(m).

Figure 6:
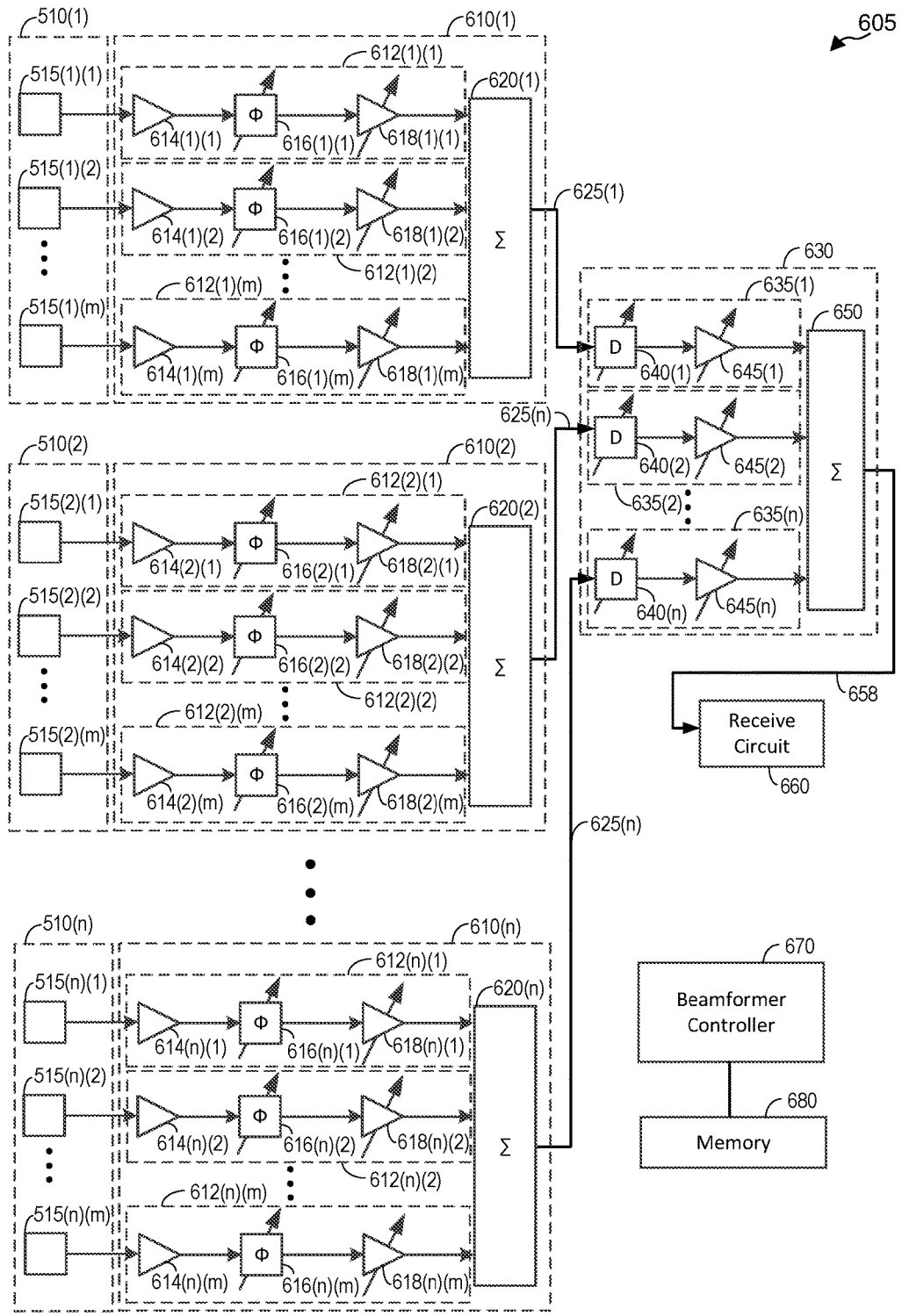
FIG. 6 illustrates an example of a hybrid beamforming system for a receiver according to aspects of the present disclosure.

FIG. 6 shows an example of a hybrid beamforming system 605 for the antenna array 505 according to certain aspects of the present disclosure. The hybrid beamforming system 605 is configured to electrically steer a receive beam of the antenna array 505 using a combination of phase shifters and time-delay elements. More particularly, for each antenna block 510(1) to 510(n) in the array 505, the hybrid beamforming system 605 uses phase shifters to provide phase shifts between the antenna elements 515(1)(1) to 515(n)(m) within the antenna block 510(1) to 510(n) based on a desired receive beam direction. The hybrid beamforming system 605 then uses time-delay elements to provide time delays between the antenna blocks 510(1) to 510(n) in the array 505 based on the desired receive beam direction. This mitigates the aforementioned negative effects of phase shifting, as discussed further below. Note that FIG. 6 does not show the physical layout of the antenna elements 515(1)(1) to 515(n)(m) on the array 505, an example of which is shown in FIG. 5.

The beamforming system 605 includes a beamformer controller 670 and multiple block circuits 610(1) to 610(n), in which each block circuit 610(1) to 610(n) corresponds to a respective one of the antenna blocks 510(1) to 510(n) of the antenna array 505. Each block circuit 610(1) to 610(n) includes multiple receive paths 612(1)(1) to 612(n)(m), in which each receive path receives a radio signal from a respective one of the antenna elements 515(1)(1) to 515(n)(m) in the respective antenna block 510(1) to 510(n). In FIG. 6, each receive path is referenced with the reference number 612 followed by a number in a first parenthesis and a number in a second parenthesis. For each receive path 612(1)(1) to 612(n)(m), the number in the first parenthesis indicates the block circuit in which the receive path is located, and the number in the second parenthesis indicates the corresponding antenna element in the respective antenna block 510(1) to 510(n). For example, receive path 612(1)(1) is located in block circuit 610(1) and receives the radio signal from antenna element 515(1)(1) in the respective antenna block 510(1). In the example shown in FIG. 6, the number of receive paths in each block circuit 610(1) to 610(n) equals the number of antenna elements 515(1)(1) to 515(n)(m) in the respective antenna block 510(1) to 510(n).

Each receive path 612(1)(1) to 612(n)(m) includes a respective low noise amplifier (LNA) 614(1)(1) to 614(n)(m), a respective phase shifter 616(1)(1) to 616(n)(m), and a respective variable gain amplifier 618(1)(1) to 618(n)(m). In each receive path 612(1)(1) to 612(n)(m), the respective LNA 614(1)(1) to 614(n)(m) amplifies the radio signal from the respective antenna element, the respective phase shifter 616(1)(1) to 616(n)(m) shifts the phase of the respective amplified radio signal by a respective phase shift, and the respective variable gain amplifier amplifies the respective phase-shifted signal. Thus, the radio signal received by each antenna element is amplified by the respective LNA, phase-shifted by the respective phase shifter, and amplified by the respective variable gain amplifier.

For each block circuit 610(1) to 610(n), the beamformer controller 670 controls the phase shifts of the phase shifters in the block circuit based on a desired receive beam direction. More particularly, for each block circuit 610(1) to 610(n), the beamformer controller 670 controls the phase shifts of the phase shifters in the block circuit such that the radio signals received from the antenna elements 515(1)(1) to 515(n)(m) in the respective antenna block 510(1) to 510(n) are phase shifted relative to one another based on the desired receive beam direction (e.g., based on equation (2) in which the frequency used for the phase shift calculations is the carrier frequency or center frequency of the received radio signals). The phase shifters in each block circuit only need to provide phase shifting between the antenna elements 515(1)(1) to 515(n)(m) within the respective antenna block 510(1) to 510(n), and not across the entire array 505. This is because the beamforming system uses time-delay elements to provide time-delays between the antenna blocks in the antenna array, as discussed above.

The beamformer controller 670 may also control the gains of the variable gain amplifiers 618(1)(1) to 618(n)(m) for beam shaping. For example, the beamformer controller 670 may set the relative gains of the variable gain amplifiers 618(1)(1) to 618(n)(m) to shape the receive beam to increase received signal strength in the desired receive direction.

Each block circuit 610(1) to 610(n) also includes a combiner 620(1) to 620(n). Each combiner 620(1) to 620(n) is coupled to the outputs of the receive paths in the respective block circuit. For example, combiner 620(1) is coupled to receive paths 612(1)(1) to 612(1)(m) in block circuit 610(1). Each combiner 620(1) to 620(n) is configured to combine the phase-shifted signals from the receive paths in the respective block circuit into a respective combined signal 625(1) to 625(n). Each combiner 620(1) to 620(n) may be implemented using a power combiner or another type of combiner.

Since each block circuit 610(1) to 610(n) corresponds to one of the antenna blocks 510(1) to 510(n) of the array 505, the combiner in each block circuit combines the phase-shifted signals for the antenna elements 515(1)(1) to 515(n)(m) in the respective antenna block 510(1) to 510(n) into the respective combined signal 625(1) to 625(n). Thus, the block circuits 610(1) to 610(n) output a combined signal 625(1) to 625(n) for each of the antenna blocks 510(1) to 510(n) of the array 505.

The beamforming system 605 also includes a combine circuit 630 that receives the combined signals 625(1) to 625(n) from the block circuits 610(1) to 610(n). The combine circuit 630 includes multiple receive paths 635(1) to 635(n), in which each receive path corresponds to a respective one of the block circuits 610(1) to 610(n). Each receive path 635(1) to 635(n) receives the combined signal 625(1) to 625(n) from the respective one of the block circuits 610(1) to 610(n).

Each receive path 635(1) to 635(n) includes a respective time-delay element 640(1) to 640(n), and a respective variable gain amplifier 645(1) to 645(n). In each receive path 635(1) to 635(n), the respective time-delay element delays the respective combined signal by a respective time delay, and the respective variable gain amplifier amplifies the respective time-delayed signal. Thus, each of combined signals 625(1) to 625(n) is timed delayed by the respective time-delay element, and amplified by the respective variable gain amplifier.

The beamformer controller 670 controls the time delays of the time-delay elements 640(1) to 640(n) based on the desired receive beam direction. More particularly, the beamformer controller 670 controls the delays of the time-delay elements 640(1) to 640(n) such that the combined signals received from the block circuits 610(1) to 610(n) are time delayed relative to one another based on the desired receive beam direction. For example, beamformer controller 670 may delay the combined signals for two antenna blocks relative to one another based on equation (1), in which the distance d is the distance between the centers of the antenna blocks or the distance between the average location of the antenna elements (e.g., 515(1)(1) to 515(1)(m)) in one of the antenna blocks (e.g., 510(1)) and the average location of the antenna elements (e.g., 515(2)(1) to 515(2)(m)) in the other antenna block (e.g., 510(2)). Thus, the time-delay elements 640(1) to 640(n) provide time delays between the antenna blocks 510(1) to 510(n) of the array 505 based on the desired receive beam direction. Each delay element may have continuous or discrete adjustable time delay, or a set of selectable time delays, as discussed further below.

The beamformer controller 670 may also control the gains of the variable gain amplifiers 645(1) to 6145(n) for beam shaping, as discussed above.

The combine circuit 630 also includes a block combiner 650 (e.g., power combiner). The block combiner 650 is configured to receive the time-delayed combined signals from the receive paths 635(1) to 635(n), and combine the time-delayed combined signals into a single combined signal 658. The combined signal 658 is output to a receive circuit 660 (e.g., an RF chain) for further processing (e.g., frequency down conversion, filtering, analog-to-digital conversion, demodulation, etc.). For example, the receive circuit 660 may frequency down convert the combined signal 658 from radio frequency (RF) to baseband (e.g., for baseband processing). Demodulation may include recovering data symbols from the combined signal 658.

The hybrid system 605 mitigates the aforementioned negative effects of phase shifting. This is because the phase shifters 616(1)(1) to 616 (n)(m) in each block circuit 610(1) to 610(n) provides phase shifting for the antenna elements 515(1)(1) to 515(n)(m) within the respective antenna block 510(1) to 510(n) based on the desired receive beam direction, and not across the entire antenna array 505. The delay elements 640(1) to 640(n) in the combine circuit 630 provide time delays between the different antenna blocks 510(1) to 510(n) of the antenna array 505 based on the desired receive beam direction.

The hybrid system 605 also reduces the cost of using delay elements by using one delay element for each antenna block 510(1) to 510(n) instead of a separate delay element for each antenna element 515(1)(1) to 515(n)(m) of the array 505, which can be cost prohibitive. In the example shown in FIG. 5, in which each antenna block 510(1) to 510(n) includes 16 antenna elements, the number of time-delay elements in the hybrid system 605 is 1/16 the number of time-delay elements compared with a system that uses a separate time-delay element for each individual antenna element.

As discussed above, the negative effects of phase shifting scale with the overall size of the antenna array for a system that only uses phase shifters for beamforming. In contrast, for the hybrid system 605, the negative effects scale with the size of each antenna block 510(1) to 510(n) instead of the overall size of the array 505. This allows the use of a larger antenna array compared with systems that only use phase shifters for beamforming.

For example, for a symbol bandwidth of 2 GHz and a system that only uses phase shifting for beamforming, an array width of 2 to 3 cm may be acceptable, while an array width of 10 cm may lead to incorrect symbol combining (and therefore not work). In this example, the hybrid system 605 allows the use of an antenna array having a width of 10 cm or more, as long as the width of each antenna block in the array is limited to 2 to 3 cm.

As discussed above, the beamformer controller 670 sets the phase shifts of the phase shifters 616(1)(1) to 616(n)(m) and the time delays of the time-delay elements 640(1) to 640(n) to point the receive beam of the array 505 in a desired direction. The desired direction may be determined, for example, using beam training. In this example, the beamformer controller 670 may sequentially point the receive beam in a plurality of different directions during a training procedure. The receive circuit 660 may receive a training signal in each one of the different directions from a target device. The receive circuit 660 may then measure the strength (e.g., signal-to-noise ratio (SNR), receive signal strength indicator (RSSI), etc.) of the received training signal for each one of the different directions. The beamformer controller 670 may then select the direction with the highest measured signal strength for receiving communication signals from the target device. Thus, in this example, the desired direction for the receive beam corresponds to the direction with the highest measured signal strength. It is to be appreciated that the present disclosure is not limited to this example, and that the desired receive direction may be determining using other techniques.

In certain aspects, the beamformer controller 670 may be configured to point the receive beam of the array 505 in any one of a plurality of different receive beam directions. For each one of the receive beam directions, the beamformer controller 670 may store a corresponding set of phase shift values for each block circuit 610(1) to 610(n) and a corresponding set of delay values for the delay elements 640(1) to 640(n) in a memory 680. In this example, when a receive beam direction is selected, the beamformer controller 670 may retrieve the set of phase shift values for each block circuit 610(1) to 610(n) and the set of delay values for the delay elements 640(1) to 640(n) corresponding to the selected receive beam direction from the memory 680. For each block circuit 610(1) to 610(n), the beamformer controller 670 may set the phase shift of each phase shifter in the block circuit according to a respective one of the phase shift values in the set of phase shift values for the block circuit. The beamformer controller 670 may also set the delay of each delay element 640(1) to 640(n) to a respective one of the delay values in the set of delays. The set of phase shift values for each block circuit 610(1) to 610(n) may be the same (e.g., if the antenna blocks are the same) or different.

Figure 7:
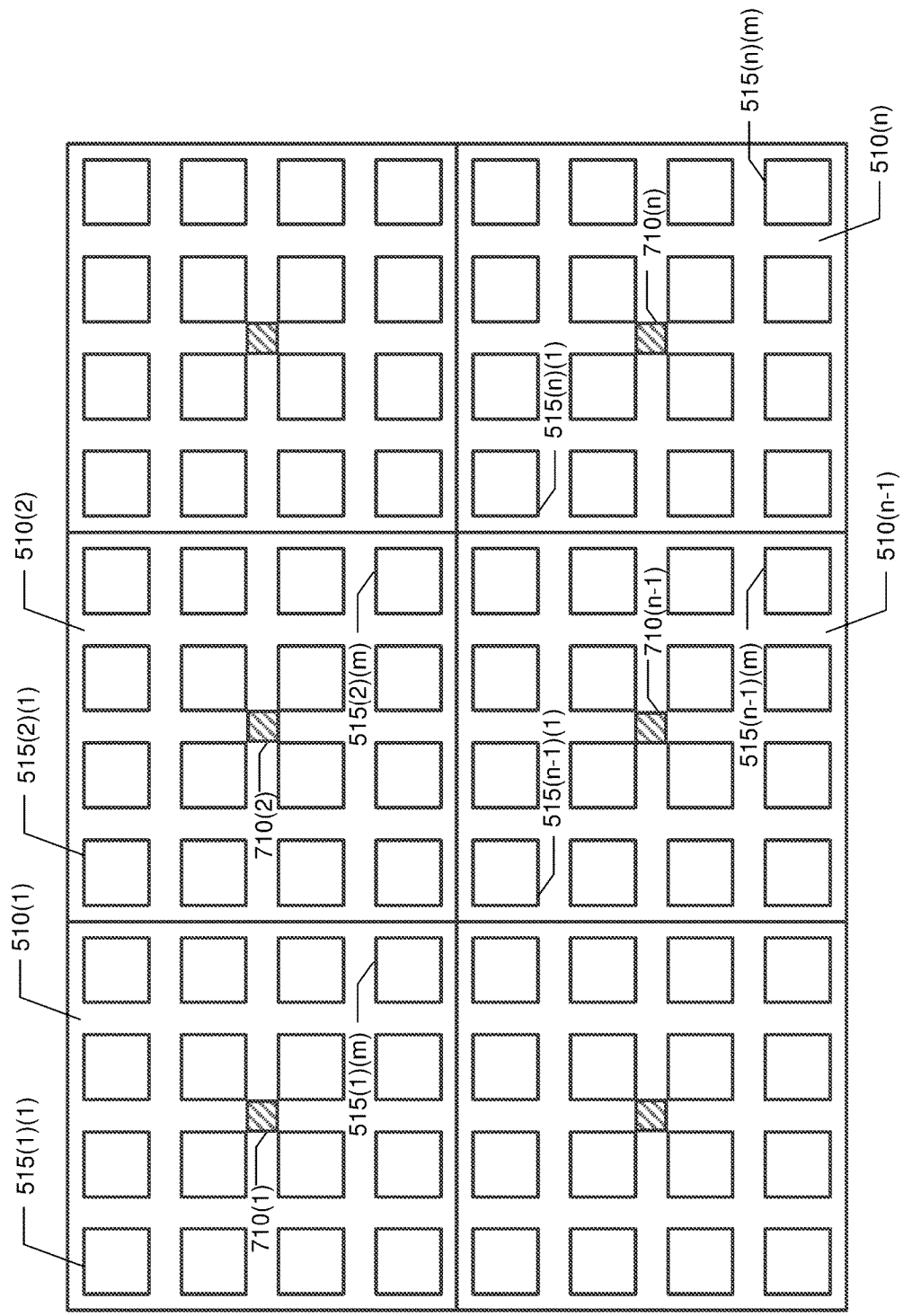
FIG. 7 illustrates an example of chips located approximately at the centers of the antenna blocks of the antenna array shown in FIG. 5 according to aspects of the present disclosure.

In certain aspects, each of the block circuits 610(1) to 610(n) may be integrated on a separate chip (die). In this regard, FIG. 7 shows an example, in which each of the block circuits 610(1) to 610(n) is integrated on a respective one of a plurality of chips (dies) 710(1) to 710(n). In this example, each of the chips 710(1) to 710(n) is located approximately in the center of the respective antenna block 510(1) to 510(n) (i.e., the antenna block 510(1) to 510(n) corresponding to the block circuit 610(1) to 610(n) integrated on the chip). Each chip 710(1) to 710(n) is coupled to each of the antenna elements 515(1)(1) to 515(n)(m) in the respective antenna block 510(1) to 510(n) via conductive traces, cables, transmission lines, wires, etc. For ease of illustration, the individual connections between each chip 710(1) to 710(n) and the respective antenna elements 515(1)(1) to 515(n)(m) are not shown in FIG. 7. Locating each chip 710(1) to 710(n) approximately in the center of the respective antenna block 510(1) to 510(n) helps minimize the length of the longest connection between the chip and an antenna element in the respective antenna block 510(1) to 510(n).

In certain aspects, the antenna elements 515(1)(1) to 515(n)(m) may be mounted on a common substrate (e.g., printed circuit board, semiconductor substrate, etc.). In these aspects, the chips 710(1) to 710(n) may also be mounted on the substrate, where each chip is located at approximately the center of the respective antenna block. In other aspects, the antenna elements 515(1)(1) to 515(n)(m) for each antenna block 510(1) to 510(n) may be mounted on a separate substrate (e.g., printed circuit board, semiconductor substrate, etc.). In these aspects, each chip 710(1) to 710(n) may be mounted on the substrate of the respective block circuit 510(1) to 510(n).

In the example in FIG. 7, the combine circuit 630 may be integrated on a chip (not shown) that is coupled to the chips 710(1) to 710(n) via conductive traces, cables, transmission lines, wires, etc. The receive circuit 660 may be integrated on the same chip as the combine circuit 630 or on a separate chip that is coupled to the output of the combine circuit 630.

In the above example, each of the block circuits 610(1) to 610(n) is integrated on the respective one of the chips 710(1) to 710(n). However, it is to be appreciated that the present disclosure is not limited to this example. For each, for each of the block circuits 610(1) to 610(n), the receive paths 612(1)(1) to 612(n)(m) of the block circuit may be integrated on the respective one of the chips (dies) 710(1) to 710(n) while the combiner 620(1) to 620(n) of the block circuit is integrated on the same chip as the combine circuit 630.

Figure 8:
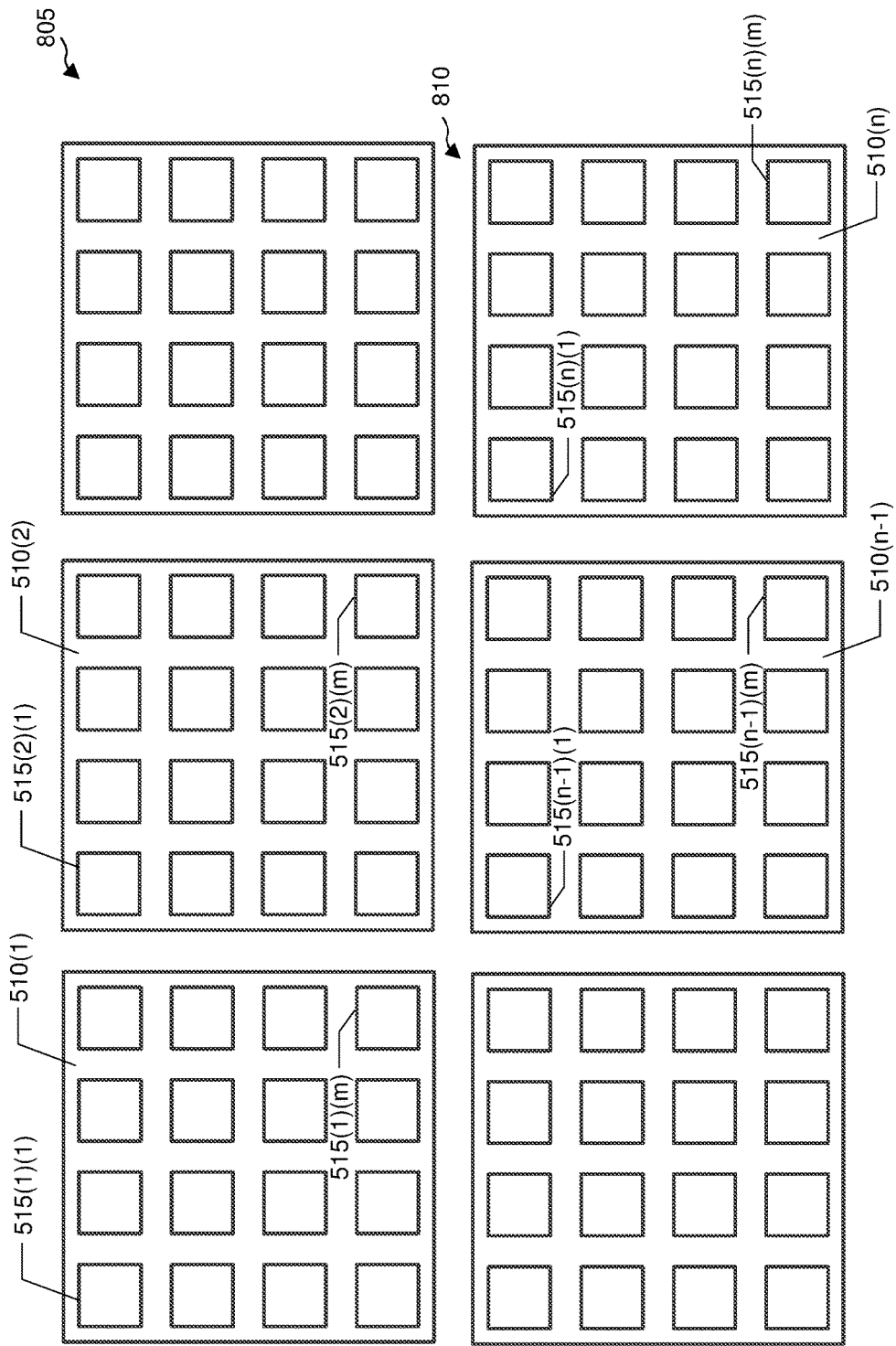
FIG. 8 illustrates an example in which the antenna blocks of the antenna array shown in FIG. 5 are spaced apart according to aspects of the present disclosure.

In certain aspects, the antenna blocks 510(1) to 510(n) may be spaced apart. In this regard, FIG. 8 shows an example in which the antenna blocks 510(1) to 510(n) are spaced apart by a gap 810 between adjacent antenna blocks 510(1) to 510(n). In this example, the antenna elements 515(1)(1) to 515(n)(m) may be mounted on a common substrate (e.g., printed circuit board, semiconductor substrate, etc.). Alternatively, the antenna elements 515(1)(1) to 515(n)(m) for each antenna block 510(1) to 510(n) may be mounted on a separate substrate (e.g., printed circuit board, semiconductor substrate, etc.). In this example, the antenna elements 515(1)(1) to 515(n)(m) within each antenna block 510(1) to 510(n) may be spaced close together (e.g., half a wavelength of the radio signal to be received or transmitted), while adjacent antenna blocks 510(1) to 510(n) may be spaced farther apart.

In certain aspects, the delay elements may be implemented in the digital domain. Although this might be a non-efficient method, in some cases where a specific transmission or reception is done with less spatial streams than the number of RF chains on the device, the device may choose to activate more than one RF chain per stream thus increasing the beamforming gain. In this case, the combining of the RF chains can be done in the digital domain, and digital delay is possible.

Figure 9:
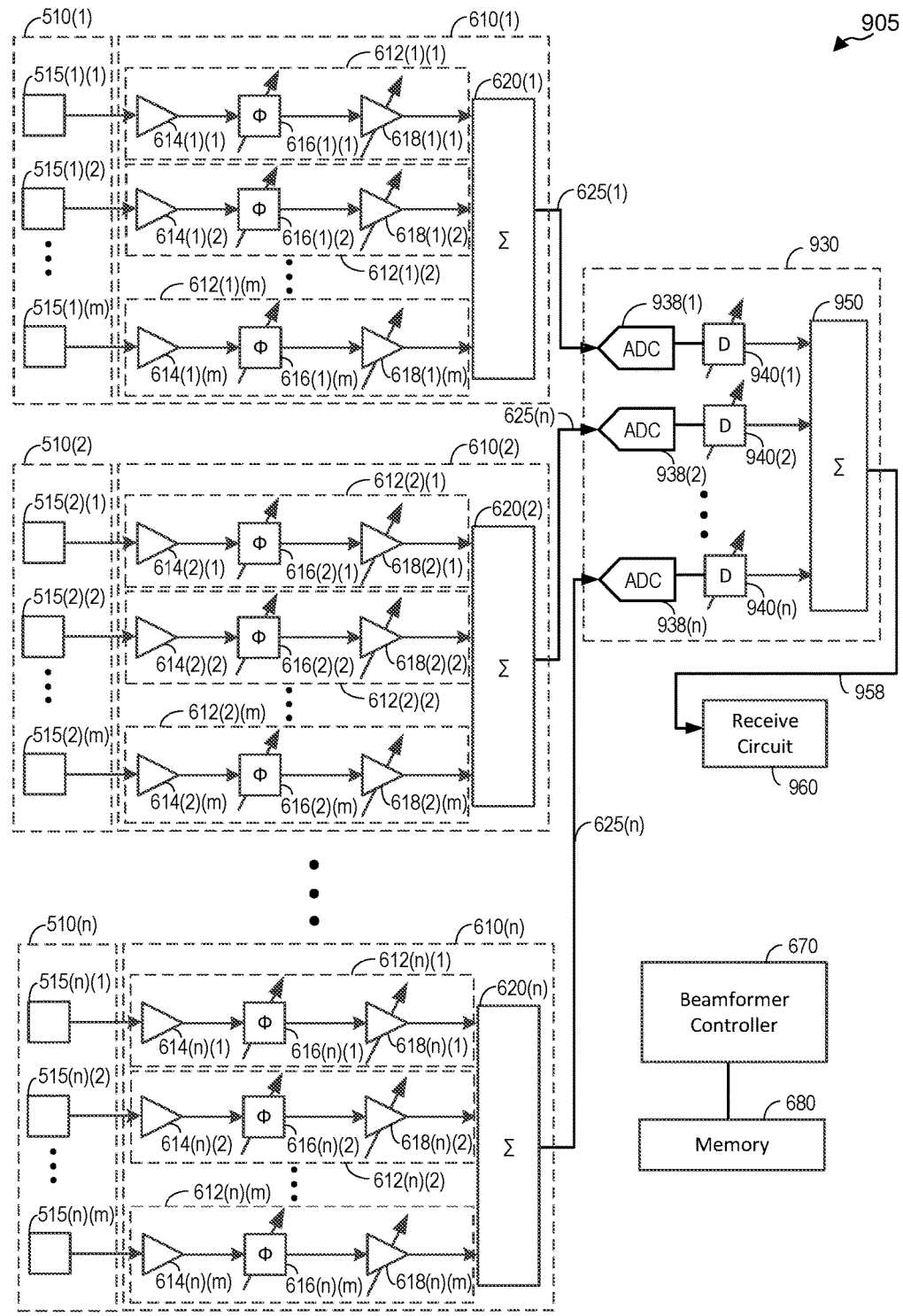
FIG. 9 illustrates an example of the hybrid beamforming system in which delay elements are implemented in the digital domain according to aspects of the present disclosure.

In this regard, FIG. 9 shows an example in which the delay elements 910(1) to 910(n) are implemented in the digital domain. In this example, the combine circuit 630 includes multiple analog-to-digital converters (ADCs) 938(1) to 938(n), where each of the ADCs 938(1) to 938(n) receives the combined signal 625(1) to 625(n) from a respective one of the block circuits 610(1) to 610(n). The combined signals 625(1) to 625(n) from the block circuits 610(1) to 610(n) are converted into digital signals by the respective ADCs 938(1) to 938(n) before being delayed in the digital domain.

Each of the digital delay elements 940(1) to 940(n) delays the respective digital combined signal by a respective delay. The beamformer controller 670 controls the delays of the delay elements 940(1) to 940(n) based on the desired receive beam direction, as discussed above. The combiner 950 receives the delayed combined signals from the delay elements 940(1) to 940(n) in the digital domain, and combines the delayed combined signals into a single combined signal 958 in the digital domain. The combined signal 958 is output to a receive circuit 960 (e.g., an RF chain) for further processing (e.g., frequency down conversion, filtering, demodulation, etc.).

Figure 10:
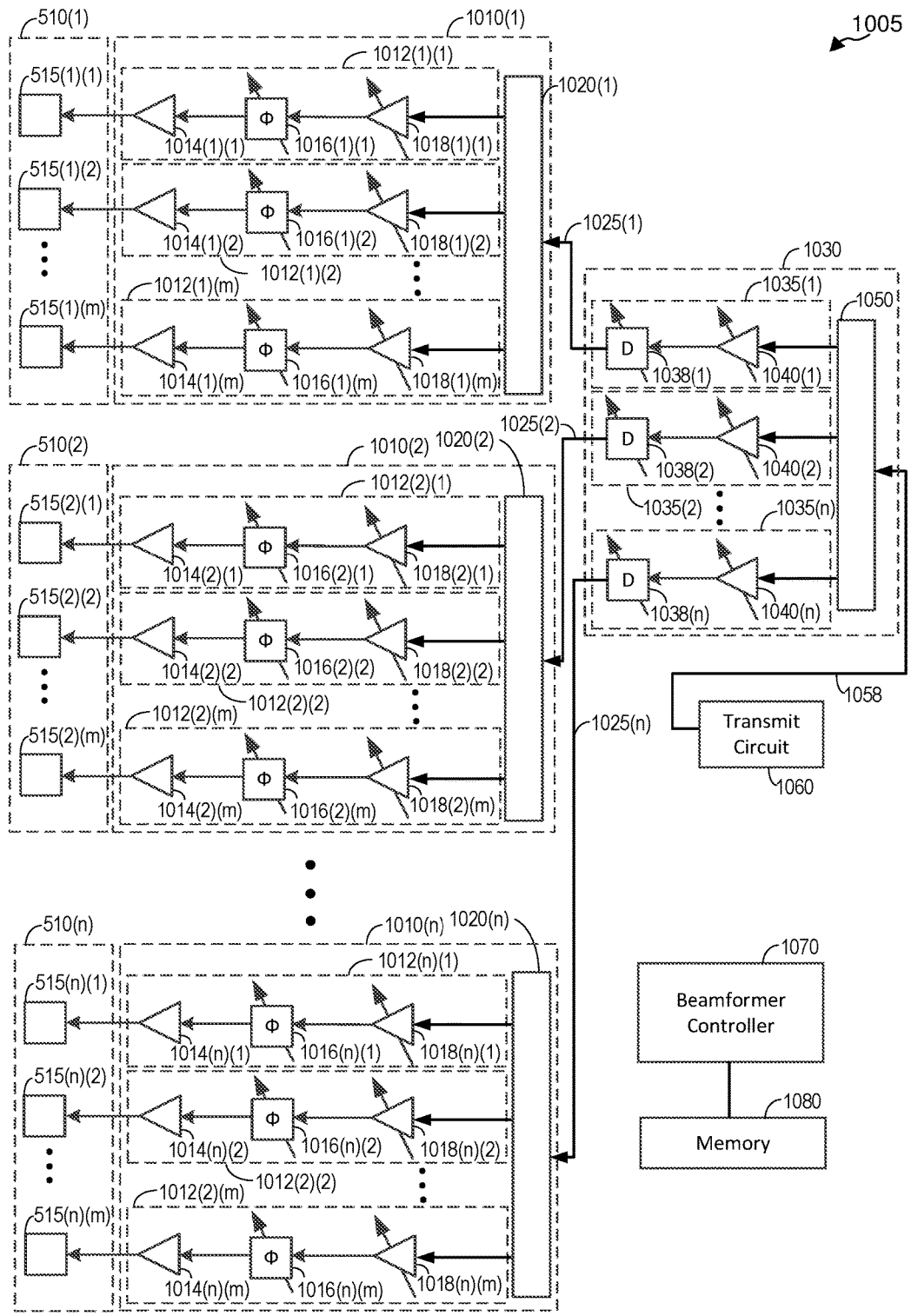
FIG. 10 illustrates an example of a hybrid beamforming system for a transmitter according to aspects of the present disclosure.

Although aspects of the present disclosure are described above for a receiver, it is to be understood that the present disclosure can also be applied to a transmitter. In this regard, FIG. 10 shows an example of a hybrid beamforming system 1005 for a transmitter according to certain aspects of the present disclosure. The hybrid beamforming system 1005 is configured to electrically steer a transmit beam of the antenna array 505 using a combination of time-delay elements and phase-shifters. More particularly, the system 1005 receives a transmit signal (e.g., a data stream) 1058 from a transmit circuit 1060. The system 1005 splits the received transmit signal into multiple transmit signals (one for each antenna block), and delays each of the transmit signals by a respective delay based on a desired transmit beam direction. The system 1005 then splits the delayed transmit signal for each antenna block into multiple signals (one for each antenna element in the antenna block). For each antenna block, the system 1005 phase shifts the respective signals by respective phase shifts based on the desired transmit beam direction, and feeds the resulting phase-shifted signals to the respective antenna elements 515(1)(1) to 515(n)(m) in the antenna block 510(1) to 510(n) for transmission (e.g., to a target wireless node).

The hybrid beamforming system 1005 includes a beamformer controller 1070 and a delay circuit 1030 that receives a transmit signal (e.g., a data stream) 1058 from the transmit circuit 1060. The transmit circuit 1060 may perform modulation, frequency up-conversion (e.g., frequency up-conversion from baseband to RF) filtering and/or digital-to-analog conversion on the transmit signal before outputting the transmit signal 1058 to the delay circuit 1030. The delay circuit 1030 includes a splitter 1050 configured to split the received transmit signal 1058 into multiple transmit signals, where each of the multiple transmit signals corresponds to a respective one of the antenna blocks 510(1)-510(n). The splitter 1050 may be implemented with a power divider or another type of splitter.

The delay circuit 1030 includes multiple transmit paths 1035(1) to 1035(n), in which each transmit path 1035(1) to 1035(n) corresponds to a respective one of the antenna blocks 510(1) to 510(n). Each transmit path 1035(1) to 1035(n) receives the transmit signal for the respective one of the antenna blocks 510(1) to 510(n) from the splitter 1050. Each transmit path 1035(1) to 1035(n) includes a respective variable gain amplifier 1040(1) to 1040(n) and a respective time-delay element 1038(1) to 1038(n). In each transmit path 1035(1) to 1035(n), the respective variable gain amplifier amplifies the respective transmit signal, and the respective time-delay element delays the respective transmit signal. Thus, the transmit signal for each antenna block is amplified by the respective variable gain amplifier, and timed delayed by the respective time-delay element.

The beamformer controller 1070 controls the time delays of the time-delay elements 1038(1) to 1038(n) based on the desired transmit beam direction. More particularly, the beamformer controller 1070 controls the delays of the time-delay elements 1038(1) to 1038(n) such that the transmit signals for the antenna blocks are time delayed relative to one another based on the desired transmit beam direction. For example, the beamformer controller 1070 may delay the signals for two antenna blocks relative to one another based on equation (1), in which the distance d is the distance between the centers of the antenna blocks or the distance between the average location of the antenna elements (e.g., 515(1)(1) to 515(1)(m)) in one of the antenna blocks (e.g., 510(1)) and the average location of the antenna elements (e.g., 515(2)(1) to 515(2)(m)) in the other antenna block (e.g., 510(2)). Thus, the time-delay elements 1038(1) to 1038(n) provide time delays between the antenna blocks 510(1) to 510(n) of the antenna array 505 based on the desired transmit beam direction.

The beamformer controller 1070 may also control the gains of the variable gain amplifiers 1040(1) to 1040(n) for beam shaping, as discussed above. For example, the beamformer controller 1070 may set the relative gains of the variable gain amplifiers 1040(1) to 1040(n) to shape the transmit beam to increase power in the desired transmit direction.

The hybrid beamforming system 1005 also includes multiple block circuits 1010(1) to 1010(n), in which each block circuit corresponds to a respective one the antenna blocks 510(1) to 510(n) of the antenna array 505. Each block circuit 1010(1) to 1010(n) receives the delayed transmit signal 1025(1) to 1025(n) for the respective antenna block 510(1) to 510(n) from the delay circuit 1030. For example, block circuit 1010(1) receives the delayed transmit signal 1025(1) for antenna block 510(1).

Each block circuit 1010(1) to 1010(n) includes multiple transmit paths 1012, in which each transmit path is coupled to a respective one of the antenna elements 515(1)(1) to 515(n)(m) in the respective antenna block 510(1) to 510(n). In FIG. 10, each transmit path is referenced with the reference number 1012 followed by a number in a first parenthesis and a number in a second parenthesis. For each transmit path 1012(1)(1) to 1012(n)(m), the number in the first parenthesis indicates the block circuit in which the transmit path is located, and the number in the second parenthesis indicates the corresponding antenna element in the respective antenna block 510(1) to 510(1). Each block circuit 1010(1) to 1010(n) also includes a respective splitter 1020(1) to 1020(n) (e.g., power divider) that splits the respective delayed transmit signal into multiple signals, where each of the multiple signals is input to a respective one of the transmit paths of the block circuit, as shown in FIG. 10.

Each transmit path 1012(1)(1) to 1012(n)(m) includes a respective variable gain amplifier 1018(1)(1) to 1018(n)(m), a respective phase shifter 1016(1)(1) to 1016(n)(m), and a respective power amplifier (PA) 1014(1)(1) to 1014(n)(m). In each transmit path 1012(1)(1) to 1012(1)(1), the respective variable gain amplifier 1018(1)(1) to 1018(n)(m) amplifies the respective transmit signal, the respective phase shifter 1016(1)(1) to 1016(n)(m) shifts the phase of the respective transmit signal by a respective phase shift, and the respective PA 1014(1)(1) to 1014(n)(m) amplifies the respective phase-shifted transmit signal for transmission via the respective antenna element 515(1)(1) to 515(n)(m). Thus, the transmit signal for each antenna element is amplified by the respective variable gain amplifier, phase-shifted by the respective phase shifter, and amplified by the respective PA for transmission. Each transmit path 1012(1)(1) to 1012(n)(m) outputs the respective output signal to the respective antenna element 515(1)(1) to 515(n)(m) for transmission via the respective antenna element.

For each block circuit 1010(1) to 1010(n), the beamformer controller 1070 controls the phase shifts of the phase shifters 1016(1)(1) to 1016(n)(m) in the block circuit 1010(1) to 1010(n) based on a desired transmit beam direction. More particularly, for each block circuit 1010(1) to 1010(n), the beamformer controller 1070 controls the phase shifts of the phase shifters in the block circuit such that transmit signals are phase shifted relative to one another based on the desired transmit beam direction (e.g., based on equation (2) in which the frequency used for the phase shift calculations is the carrier frequency or center frequency of the transmit signals). The phase shifters 1016(1)(1) to 1016(n)(m) in each block circuit 1010(1) to 1010(n) provide phase shifting between the antenna elements 515(1)(1) to 515(n)(m) within the respective antenna block 510(1) to 510(n), and not across the entire array 505. This is because the beamforming system uses the time-delay elements 1038(1) to 1038(n) to provide time delays between the antenna blocks 510(1) to 510(n) in the antenna array 505, as discussed above.

The beamformer controller 1070 may also control the gains of the variable gain amplifiers 1018(1)(1) to 1018(n)(m) for beam shaping, as discussed above.

As discussed above, the beamformer controller 1070 sets the phase shifts of the phase shifters 1016(1)(1) to 1016(n)(m) and the time delays of the time-delay elements 1038(1) to 1038(n) to point the transmit beam of the array 505 in a desired direction. The desired direction may be determined, for example, using beam training. In this example, the beamformer controller 1070 may sequentially point the transmit beam in a plurality of different directions during a training procedure, and transmit a training signal in each one of the different transmit directions to a target device. The target device may measure the receive signal strength (e.g., signal-to-noise ratio (SNR), receive signal strength indicator (RSSI), etc.) of the training signal for each one of the different directions. The target device may then select the direction with the highest measured signal strength, and communicate the selected direction to the beamformer controller 1070 (e.g., via a wireless link). Thus, in this example, the desired direction for the transmit beam corresponds to the direction with the highest measured signal strength. It is to be appreciated that the present disclosure is not limited to this example, and that the desired direction may be determining using other techniques.

In certain aspects, the beamformer controller 1070 may be configured to point the transmit beam of the antenna array 505 in any one of a plurality of different transmit beam directions. For each one of the transmit beam directions, the beamformer controller 1070 may store a corresponding set of phase shift values for each block circuit 1010(1) to 1010(n) and a corresponding set of delay values for the delay elements 1038(1) to 1038(n) in a memory 1080. In this example, when a transmit beam direction is selected, the beamformer controller 1070 may retrieve the set of phase shift values for each block circuit 1010(1) to 1010(n) and the set of delay values for the delay elements 1038(1) to 1038(n) corresponding to the selected transmit beam direction from the memory 1080. For each block circuit 1010(1) to 1010(n), the beamformer controller 1070 may set the phase shift of each phase shifter in the block circuit according to a respective one of the phase shift values in the set of phase shift values for the block circuit. The beamformer controller 1070 may also set the delay of each delay element according to a respective one of the delay values in the set of delay values. The set of phase shift values for each block circuit 1010(1) to 1010(n) may be the same (e.g., if the antenna blocks are the same) or different.

It is to be appreciated that the delay elements 1038(1) to 1038(n) may be implemented in the digital domain similar to the delay elements 940(1) to 940(n) in FIG. 9. In this case, the delayed transmit signal from the delay elements 1038(1) to 1038(n) may be converted from the digital domain to analog domain by digital-to-analog converters (DACs) before being output to the block circuits 1010(1) to 1010(n).

A delay element according to any of the above embodiments may have a continuous adjustable time delay, or a set of selectable time delays. In other words, a delay element may comprise a continuous adjustable delay element or a discrete adjustable delay element. For the example in which the delay element has a set of selectable time delays, the delay element may include a plurality of selectable delay lines having different lengths and switches for selecting one or more of the delay lines at a time. In this example, the time delay of the delay element is set to a desired time delay by selecting one or more of the delay lines corresponding to the desired time delay (i.e., by closing the switches corresponding to the selected one or more delay lines and opening the switches corresponding to the unselected delay lines). The selected one or more delay lines are coupled between the input and output of the delay element by the respective switches. In this example, the delay of the delay element is adjusted by adjusting the length of the delay path (e.g., length of the selected delay line) in the delay element on which the signal propagates.

A phase shifter according to any of the above embodiments may be implemented using any one of a variety of phase shifters known in the art. For example, a phase shifter may include a plurality of selectable elements (e.g., capacitors, inductors, resistors, and/or inverters) and switches. In this example, the switches are configured to selectively connect one or more of the elements between the input and output of the phase shifter in any one of a plurality of different configurations, where each configuration corresponds to a different phase shift that may be selected. In this example, the phase shift of the phase shifter is set to a desired phase shift by connecting one or more of the elements in the configuration corresponding to the desired phase shift using the switches. The selectable phase shifts of the phase shifter may be for a center frequency or carrier frequency (e.g. 60 GHz) of the radio signal to be phase shifted.

Figure 11:
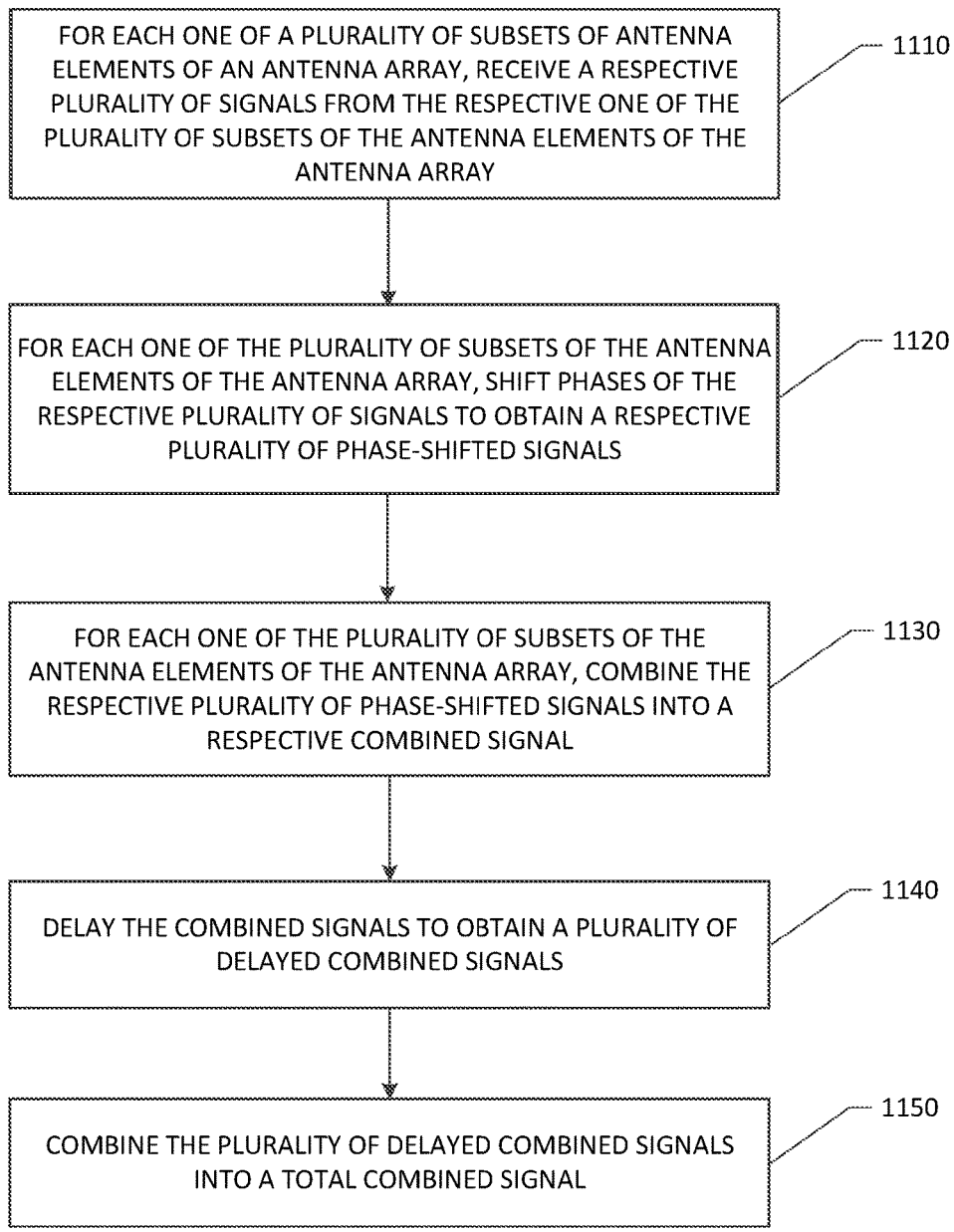
FIG. 11 is a flowchart illustrating an exemplary method for wireless communications according to aspects of the present disclosure.

FIG. 11 illustrates a method 1100 for wireless communications according to certain aspects of the present disclosure. The method 1100 may be performed by the hybrid beamforming system 605 or 905.

At step 1110, for each one of a plurality of subsets of antenna elements of an antenna array, a respective plurality of signals is received from the respective one of the plurality of subsets of the antenna elements of the antenna array. For example, each one of the plurality of subsets of the antenna elements of the antenna array (e.g., antenna array 505) may correspond to a respective one of the antenna blocks 510(1) to 510(n).

At step 1120, for each one of the plurality of subsets of the antenna elements of the antenna array, phases of the respective plurality of signals are shifted to obtain a respective plurality of phase-shifted signals. For example, for each subset of the antenna elements of the antenna array, the phases of the respective plurality of signals may be shifted by a set of phase shift values (e.g., by respective phase shifters) for a desired receive beam direction.

At step 1130, for each one of the plurality of subsets of the antenna elements of the antenna array, the respective plurality of phase-shifted signals are combined into a respective combined signal. For example, for each subset of the antenna elements of the antenna array, the respective phase-shifted signals may be combined by a respective one of the combiners 620(1) to 620(n).

At step 1140, the combined signals are delayed to obtain a plurality of delayed combined signals. For example, the combined signals (e.g., 625(1) to 625(n)) may be delayed by a set of time delay values (e.g., by respective delay elements 640(1) to 640(n)) for the desired receive beam direction.

At step 1150, the plurality of delayed combined signals are combined into a total combined signal. For example, the delayed combined signals may be combined by a combiner (e.g., block combiner 650). The total combined signal (e.g., combined signal 658) may be output to an RF chain for further processing (e.g., frequency down-conversion, demodulation, etc.).

Figure 12:
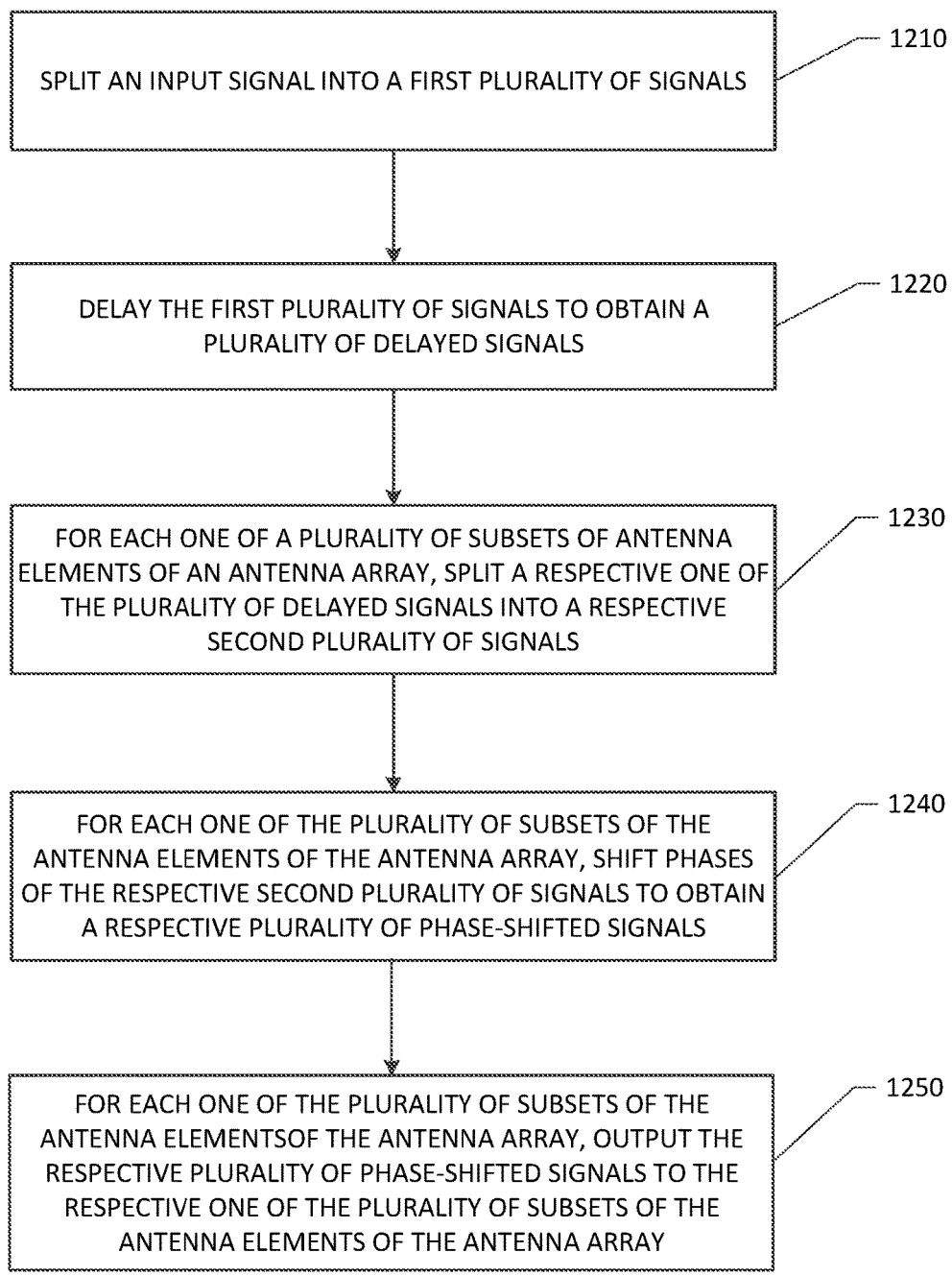
FIG. 12 is a flowchart illustrating another exemplary method for wireless communications according to aspects of the present disclosure.

FIG. 12 illustrates a method 1200 for wireless communications according to certain aspects of the present disclosure. The method 1200 may be performed by the hybrid beamforming system 1005.

At step 1210, an input signal is split into a first plurality of signals. For example, the input signal (e.g., input signal 1058) may be split by a splitter (e.g., splitter 1050).

At step 1220, the first plurality of signals are delayed to obtain a plurality of delayed transmit signals. For example, the first plurality of signals may be delayed by a set of time delay values (e.g., by respective time-delay elements 1038(1) to 10380(n)) for a desired transmit beam direction.

At step 1230, for each one of a plurality of subsets of antenna elements of an antenna array, a respective one of the plurality of delayed signals is split into a respective second plurality of signals. For example, for each subset of the antenna elements of the antenna array, the respective one of the delayed signals (e.g., respective one of delayed transmit signals 1025(1) to 1025(n)) may be split by a respective splitter (e.g., a respective one of the splitters 1020(1) to 1020(n)). Each subset of the antenna elements of the antenna array may correspond to a respective one of the antenna blocks 510(1) to 510(n) of antenna array 505.

At step 1240, for each one of the plurality of subsets of the antenna elements of the antenna array, phases of the respective second plurality of signals are shifted to obtain a respective plurality of phase-shifted signals. For example, for each subset of the antenna elements of the antenna array, the phases of the respective second plurality of signals may be shifted by a set of phase shift values (e.g., by respective phase shifters) for the desired transmit beam direction.

At step 1250, for each one of the plurality of subsets of the antenna elements of the antenna array, the respective plurality of phase-shifted signals are output to the respective one of the plurality of subsets of the antenna elements of the antenna array.

Examples of means for receiving a respective plurality of signals from a respective one of the plurality of subsets of antenna elements of an antenna array include at least one of the block circuits 610(1) to 610(n), the transceivers 226-1 to 226-n, or the transceivers 266-1 to 266-n. Examples of means for shifting phases of the respective plurality of signals to obtain a respective plurality of phase-shifted signals include at least one of the phase shifters 616(1)(1) to 616(n)(m), the beamformer controller 670, the transceivers 226-1 to 226-N, or the transceivers 266-1 to 266-N. Examples of means for combining the respective plurality of phase-shifted signals into a respective combined signal include at least one of the combiners 620(1)-620(n), the receive processor 242, or the receive processor 282. Examples of means for delaying the combined signals to obtain a plurality of delayed combined signals include at least one of the delay elements 640(1) to 640(n), digital delay elements 940(1) to 940(n), the beamformer controller 670, the receive processor 242, or the receive processor 282. Examples of means for combining the plurality of delayed combined signals into a total combined signal include at least one of the combiner 650, the combiner 950, the receive processor 242, or the receive processor 282. Examples of means for shifting the phases of the respective plurality of signals by a set of phase shift values associated with a receive beam direction include at least one of the phase shifters 616(1)(1) to 616(n)(m), the beamformer controller 670, the transceivers 226-1 to 226-N, or transceivers 266-1 to 266-N. Examples of means for delaying the combined signals by a set of time delay values associated with the receive beam direction include at least one of the delay elements 640(1) to 640(n), digital delay elements 940(1)-940(n), the beamformer controller 670, the receive processor 242, or the receive processor 282. Examples of means for performing at least one of frequency down conversion of the total combined signal, analog-to-digital conversion of the total combined signal, or demodulation of the total combined signal include at least one of the receive circuit 660, the receive circuit 960, the receive processor 242, or the receive processor 282.

Examples of means for splitting an input signal into a first plurality signals include at least one of the splitter 1050, the transmit processor 224, or the transmit processor 264. Examples of means for delaying the first plurality of signals to obtain a plurality of delayed signals include at least one of the delay elements 1038(1) to 1038(n), the beamformer controller 1070, the transmit processor 224, or the transmit processor 264. Examples of means for splitting a respective one of the plurality of delayed signals into a respective second plurality of signals include at least one of the splitters 1020(1) to 1020(n), the transmit processor 224, or the transmit processor 264. Examples of means for shifting phases of the respective second plurality of signals to obtain a respective plurality of phase-shifted signals include at least one of the phase shifters 1016(1)(1) to 1016(n)(m), the beamformer controller 1070, the transceivers 226-1 to 226-N, or the transceivers 266-1 to 266-N. Examples of means for outputting the respective phase-shifted values to the respective subset of the antenna elements of the antenna array include at least one of the block circuits 1010(1) to 1010(n), the transceiver 226-1 to 226-N, or the transceiver 266-1 to 266-N. Examples of means for shifting the phases of the respective second plurality of signals by a set of phase shift values associated with a transmit beam direction include at least one of the phase shifters 1016(1)(1) to 1016(n)(m), the beamformer controller 1070, the transceivers 226-1 to 226-N, or the transceivers 266-1 to 266-N. Examples of means for delaying the first plurality of signals by a set of time delay values associated with the transmit beam direction include at least one of the delay elements 1038(1) to 1038(n), the beamformer controller 1070, the transmit processor 224, or the transmit processor 264. Examples of means for converting a data signal into the input transmit signal, wherein the conversion includes at least one of frequency up-conversion or digital-to-analog conversion include at least one of the transmit circuit 1060, the transmit processor 224, or the transmit processor 264.

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art.

Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of an access terminal 220 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by an access terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that an access terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communications, comprising:
   a plurality of block circuits, wherein each one of the plurality of block circuits is configured to receive a respective plurality of signals from a respective subset of antenna elements of an antenna array, and each one of the plurality of block circuits comprises:
      a respective plurality of phase shifters configured to shift phases of the respective plurality of signals to obtain a respective plurality of phase-shifted signals; and
      a respective combiner configured to combine the respective plurality of phase-shifted signals into a respective combined signal;
   a plurality of time-delay elements configured to delay the combined signals to obtain a plurality of delayed combined signals; and
   a combiner configured to combine the plurality of delayed combined signals into a total combined signal.

2. The apparatus of claim 1, wherein, for each one of the plurality of block circuits, the respective plurality of phase shifters is configured to shift the phases of the respective plurality of signals by a set of phase shift values associated with a receive beam direction of the antenna array.

3. The apparatus of claim 2, wherein the plurality of time-delay elements is configured to delay the combined signals by a set of time delay values associated with the receive beam direction of the antenna array.

4. The apparatus of claim 2, wherein the receive beam direction is directed towards a wireless node, and each one of the plurality of block circuits is configured to receive the respective plurality of signals from the wireless node via the respective subset of the antenna elements of the antenna array.

5. The apparatus of claim 1, further comprising at least one radio frequency (RF) chain configured to receive the total combined signal and to perform at least one of frequency down conversion of the total combined signal, analog-to-digital conversion of the total combined signal, or demodulation of the total combined signal.

6. The apparatus of claim 1, wherein each one of the plurality of time-delay elements comprises a continuous adjustable delay element or a discrete adjustable delay element.

7. A wireless node, comprising:
   an antenna array comprising antenna elements;
   a plurality of block circuits, wherein each one of the plurality of block circuits is configured to receive a respective plurality of signals from another wireless node via a respective subset of the antenna elements of the antenna array, and each one of the plurality of block circuits comprises:
      a respective plurality of phase shifters configured to shift phases of the respective plurality of signals to obtain a respective plurality of phase-shifted signals; and
      a respective combiner configured to combine the respective plurality of phase-shifted signals into a respective combined signal;
   a plurality of time-delay elements configured to delay the combined signals to obtain a plurality of delayed combined signals; and
   a combiner configured to combine the plurality of delayed combined signals into a total combined signal.

8. A method for wireless communications, comprising:
   for each one of a plurality of subsets of antenna elements of an antenna array,
      receiving a respective plurality of signals from the respective one of the plurality of subsets of the antenna elements of the antenna array;
      shifting phases of the respective plurality of signals to obtain a respective plurality of phase-shifted signals; and
      combining the respective plurality of phase-shifted signals into a respective combined signal;
   delaying the combined signals to obtain a plurality of delayed combined signals; and
   combining the plurality of delayed combined signals into a total combined signal.

9. The method of claim 8, wherein, for each one of the plurality of subsets of the antenna elements of the antenna array, shifting the phases of the respective plurality of signals comprises shifting the phases of the respective plurality of signals by a set of phase shift values associated with a receive beam direction of the antenna array.

10. The method of claim 9, wherein delaying the combined signals comprises delaying the combined signals by a set of time delay values associated with the receive beam direction of the antenna array.

11. The method of claim 9, wherein the receive beam direction is directed towards a wireless node, and, for each one of the plurality of subsets of the antenna elements of the antenna array, receiving the respective plurality of signals comprises receiving the respective plurality of signals from the wireless node via the respective one of the plurality of subsets of the antenna elements of the antenna array.

12. The method of claim 8, further comprising performing at least one of frequency down conversion of the total combined signal, analog-to-digital conversion of the total combined signal, or demodulation of the total combined signal.

* * * * *